US011140370B2

United States Patent
Tsukada

(10) Patent No.: US 11,140,370 B2
(45) Date of Patent: *Oct. 5, 2021

(54) IMAGE PROCESSING DEVICE, IMAGE PROCESSING SYSTEM, IMAGE PROCESSING METHOD, AND PROGRAM RECORDING MEDIUM FOR GENERATING A VISIBLE IMAGE AND A NEAR-INFRARED IMAGE

(71) Applicant: NEC Corporation, Tokyo (JP)

(72) Inventor: Masato Tsukada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 16/496,516

(22) PCT Filed: Mar. 31, 2017

(86) PCT No.: PCT/JP2017/013721
§ 371 (c)(1),
(2) Date: Sep. 23, 2019

(87) PCT Pub. No.: WO2018/179378
PCT Pub. Date: Oct. 4, 2018

(65) Prior Publication Data
US 2021/0112223 A1  Apr. 15, 2021

(51) Int. Cl.
*H04N 9/04* (2006.01)
*H04N 5/33* (2006.01)
(Continued)

(52) U.S. Cl.
CPC ........... *H04N 9/04553* (2018.08); *H04N 5/33* (2013.01); *H04N 9/0451* (2018.08); *H04N 9/07* (2013.01);
(Continued)

(58) Field of Classification Search
CPC ....... H04N 9/04553; H04N 9/646; H04N 5/33
See application file for complete search history.

(56) References Cited

U.S. PATENT DOCUMENTS

| 8,243,210 B2 * | 8/2012 | Bing | H04N 9/3182 |
| | | | 348/744 |
| 9,743,057 B2 * | 8/2017 | Cote | H04N 9/045 |

(Continued)

FOREIGN PATENT DOCUMENTS

| JP | 2012-227758 A | 11/2012 |
| JP | 2013-030626 A | 2/2013 |

(Continued)

OTHER PUBLICATIONS

WIPO, Translation of the Written Opinion for PCT/JP2017/013721 (dated May 16, 2017) (Year: 2017).*

(Continued)

*Primary Examiner* — David N Werner
(74) *Attorney, Agent, or Firm* — ASughrue Mion, PLLC

(57) ABSTRACT

An image processing device 100 comprises: an acquisition unit 110 that acquires a color image captured in accordance with incident light including visible light and near-infrared light, said color image including a first area and a second area that is captured with reduced near-infrared light in the incident light compared with the first area; an estimation unit f120 that estimates spectral characteristics of the incident light on the basis of color information of the acquired color image, and information modeling the spectral characteristics of the incident lights; a generation unit 130 that generates a visible light image and a near-infrared image on the basis of the estimated spectral characteristics; and a correction unit 140 that corrects the generated visible image and near-infrared image on the basis of the color information of the second area in the color image.

9 Claims, 12 Drawing Sheets

(51) Int. Cl.
   *H04N 9/07*     (2006.01)
   *H04N 9/64*     (2006.01)
   *H04N 9/77*     (2006.01)

(52) U.S. Cl.
   CPC ............... *H04N 9/646* (2013.01); *H04N 9/77* (2013.01); *H04N 9/04515* (2018.08); *H04N 9/04551* (2018.08)

(56) References Cited

U.S. PATENT DOCUMENTS

| | | | | |
|---|---|---|---|---|
| 10,863,115 | B2* | 12/2020 | Tsukada | H04N 9/07 |
| 2005/0231617 | A1* | 10/2005 | Kitani | H04N 9/646 |
| | | | | 348/246 |
| 2008/0278592 | A1* | 11/2008 | Kuno | H04N 5/332 |
| | | | | 348/222.1 |
| 2010/0289885 | A1* | 11/2010 | Lu | H04N 5/332 |
| | | | | 348/61 |
| 2012/0200734 | A1* | 8/2012 | Tang | H04N 5/23245 |
| | | | | 348/223.1 |
| 2014/0146207 | A1 | 5/2014 | Yokogawa | |
| 2014/0168378 | A1* | 6/2014 | Hall | G06F 3/0425 |
| | | | | 348/47 |
| 2015/0221691 | A1 | 8/2015 | Watanabe | |
| 2015/0256800 | A1* | 9/2015 | Sugiyama | H04N 5/374 |
| | | | | 348/279 |
| 2016/0198103 | A1* | 7/2016 | Tanaka | G03B 15/02 |
| | | | | 348/164 |
| 2017/0374299 | A1* | 12/2017 | Liu | H04N 1/60 |
| 2018/0249096 | A1 | 8/2018 | Toda | |

FOREIGN PATENT DOCUMENTS

| | | |
|---|---|---|
| WO | 2014/041742 A1 | 3/2014 |
| WO | 2017/047080 A1 | 3/2017 |

OTHER PUBLICATIONS

H. Tang, X. Zhang, S. Zhuo, F. Chen, K.N. Kutulakos, & L. Shen, "High Resolution Photography with an RGB-Infrared Camera", presented at 2015 IEEE Int'l Conf. on Comp. Photography (Apr. 2015) (Year: 2015).*

International Search Report for PCT Application No. PCT/JP2017/013721, dated May 16, 2017.

English translation of Written opinion for PCT Application No. PCT/JP2017/013721.

* cited by examiner

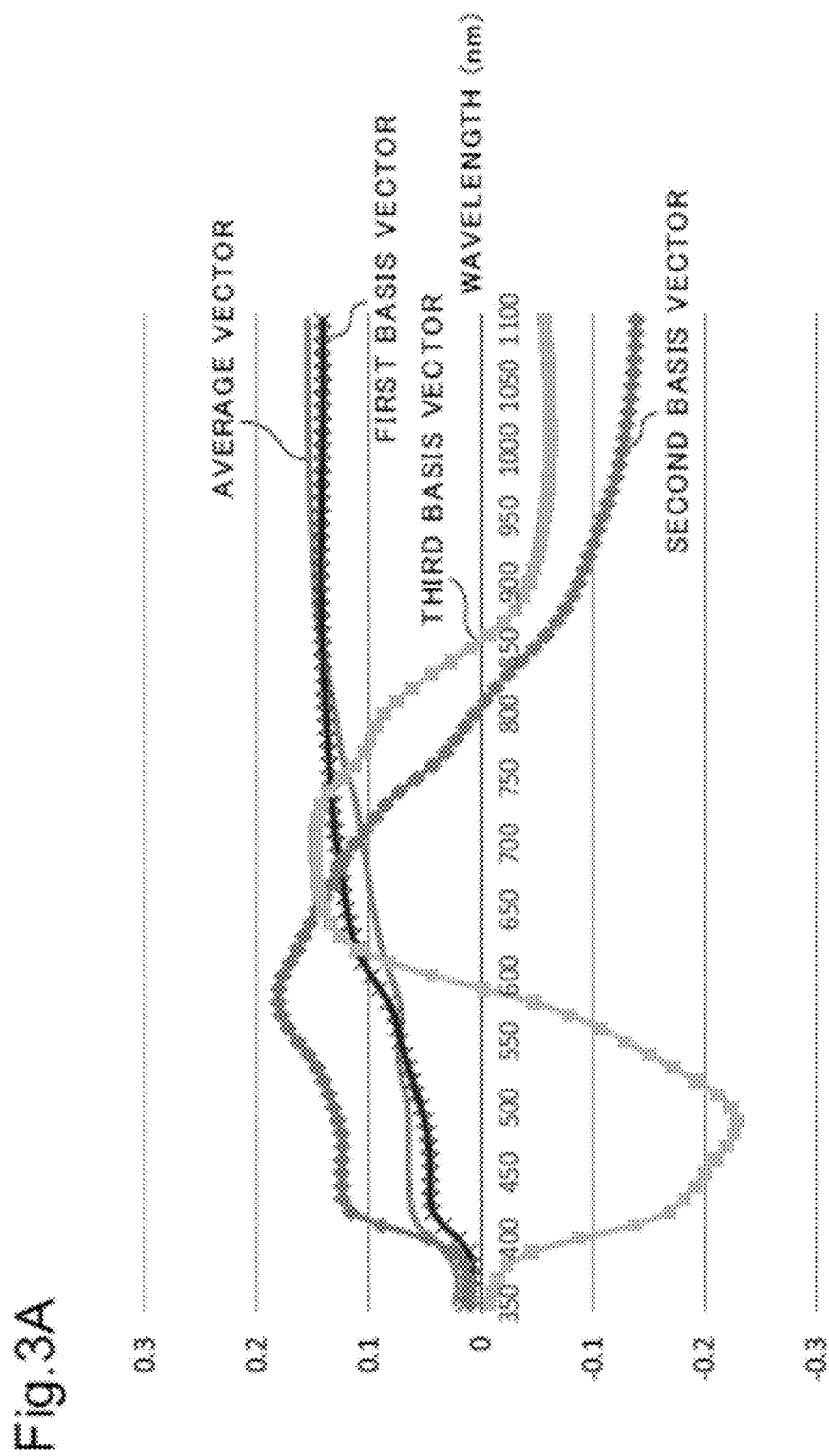

Fig.11

|   | 1 | 2 | 3 | 4 | 5 | 6 |
|---|---|---|---|---|---|---|
| 1 | R | G | R | G | R | G |
| 2 | G | B | G | B | G | B |
| 3 | R | G | R | G | R | G |
| 4 | G | B | G | B | G | B |

321

IMAGE PROCESSING DEVICE, IMAGE PROCESSING SYSTEM, IMAGE PROCESSING METHOD, AND PROGRAM RECORDING MEDIUM FOR GENERATING A VISIBLE IMAGE AND A NEAR-INFRARED IMAGE

This application is a National Stage Entry of PCT/JP2017/013721 filed on Mar. 31, 2017, the contents of all of which are incorporated herein by reference, in their entirety.

TECHNICAL FIELD

The present disclosure relates to image processing.

BACKGROUND ART

There is an image sensor for capturing a color image that has sensitivity to near-infrared light in addition to visible light, such as a silicon-based sensor, for example. The image sensor having sensitivity to the near-infrared light has a characteristic different from human color perception, and thus color reproducibility may decrease. Therefore, such an image sensor may be provided with a filter for cutting the near-infrared light from incident light.

On the other hand, there is an image sensor configured in such a way as to receive not only visible light but also infrared light for a purpose of improving sensitivity and the like. For example, PTL 1 discloses an image capturing device including a color filter that transmits a visible light component and an infrared light component. The image capturing device disclosed in PTL 1 is configured in such a way that not only light in a visible light region in red but also light in an infrared light region are incident on an image capturing element of a pixel associated with the red (R), for example.

CITATION LIST

Patent Literature

[PTL 1] Japanese Unexamined Patent Application Publication No. 2012-227758

SUMMARY OF INVENTION

Technical Problem

A complementary color filter of yellow is used in the image capturing device described in PTL 1, and thus there is a problem of color reproducibility. Further, the image capturing device described in PTL 1 includes a special sensor using a color filter having four kinds of different transmittances, and thus there is a different accompanying problem of high cost.

An exemplary object of the present disclosure is to provide a technique for acquiring a visible image having high color reproducibility by one capturing, and also acquiring a near-infrared image.

Solution to Problem

According to an aspect, an image processing device is provided. The image processing device includes acquisition means for acquiring a color image that is captured by image capturing means according to incident light including visible light and near-infrared light, and includes a first region and a second region captured with near-infrared light being further reduced from incident light than that in the first region; estimation means for estimating a spectral characteristic of incident light, based on color information about the acquired color image, a spectral sensitivity characteristic of the image capturing means, and information acquired by modeling a spectral characteristic of the incident light; generation means for generating a visible image and a near-infrared image, based on the estimated spectral characteristic and a spectral sensitivity characteristic of the image capturing means; and correction means for correcting the generated visible image and the generated near-infrared image, based on color information in the second region of the color image.

According to another aspect, an image processing system is provided. The image processing system includes: an image capturing device that includes a filter that reduces near-infrared light of incident light in a specific region further than that in another region, and image capturing means for generating a color image of M channels (M is an integer equal to or greater than two) according to incident light transmitted through the filter; and an image processing device that includes acquisition means for acquiring a color image captured by the image capturing means, estimation means for estimating a spectral characteristic of the incident light, based on color information about the acquired color image, a spectral sensitivity characteristic of the image capturing means, and information acquired by modeling a spectral characteristic of the incident light, generation means for generating a visible image and a near-infrared image, based on the estimated spectral characteristic of the incident light and a spectral sensitivity characteristic of the image capturing means, and correction means for correcting the generated visible image and the generated near-infrared image, based on color information in a region captured by the image capturing means through the specific region of the color image.

According to further another aspect, an image processing method is provided. The image processing method includes: acquiring a color image that is captured by image capturing means according to incident light including visible light and near-infrared light, and includes a first region and a second region captured with near-infrared light being further reduced from incident light than that in the first region; estimating a spectral characteristic of incident light, based on color information about the acquired color image, a spectral sensitivity characteristic of the image capturing means, and information acquired by modeling a spectral characteristic of the incident light; generating a visible image and a near-infrared image, based on the estimated spectral characteristic and a spectral sensitivity characteristic of the image capturing means; and correcting the generated visible image and the generated near-infrared image, based on color information in the second region of the color image.

According to further another aspect, a computer-readable program recording medium that records a program is provided. The program causes a computer to execute: a step of acquiring a color image that is captured by image capturing means according to incident light including visible light and near-infrared light, and includes a first region and a second region captured with near-infrared light being further reduced from incident light than that in the first region; a step of estimating a spectral characteristic of incident light, based on color information about the acquired color image, a spectral sensitivity characteristic of the image capturing means, and information acquired by modeling a spectral characteristic of the incident light; a step of generating a visible image and a near-infrared image, based on the estimated spectral characteristic and a spectral sensitivity characteristic of the image capturing means; and a step of correcting the generated visible image and the generated near-infrared image, based on color information in the second region of the color image.

Advantageous Effects of Invention

The present disclosure is able to acquire a visible image having high color reproducibility by one capturing, and also acquire a near-infrared image.

BRIEF DESCRIPTION OF DRAWINGS

FIG. 3A is a diagram illustrating one example of an average vector and a basis vector.

FIG. 11 is a diagram illustrating one example of a configuration of an optical filter.

EXAMPLE EMBODIMENT

First Example Embodiment

Figure 1:
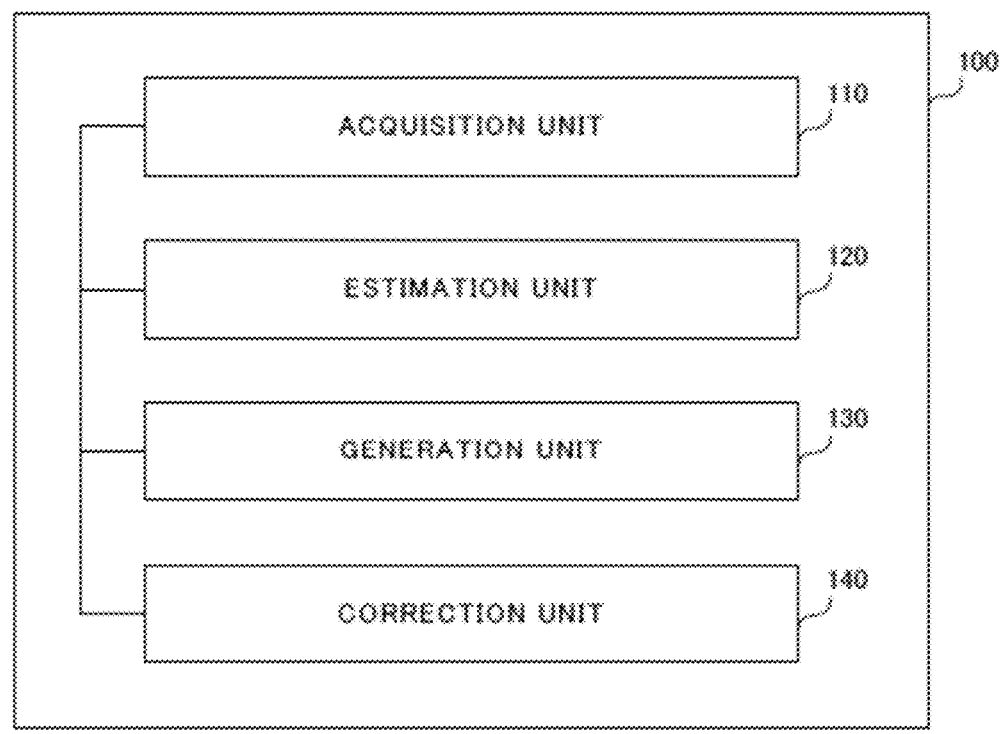
FIG. 1 is a block diagram illustrating one example of a configuration of an image processing device.

FIG. 1 is a block diagram illustrating a configuration of an image processing device 100 according to one example embodiment. The image processing device 100 is configured to include at least an acquisition unit 110, an estimation unit 120, a generation unit 130, and a correction unit 140. The image processing device 100 may include another configuration.

The acquisition unit 110 acquires a color image. The acquisition unit 110 acquires a color image according to incident light including visible light and near-infrared light captured by an image capturing unit including an image sensor having sensitivity to any of the visible light and the near-infrared light. The acquisition unit 110 may directly acquire a color image from the image capturing unit, or may acquire, from the storage medium, a color image stored in a storage medium after being captured by the image capturing unit.

The visible light herein is light (namely, an electromagnetic wave) in a wavelength region of approximately 400 to 700 nm. On the other hand, the near-infrared light generally represents light in a wavelength region of approximately 700 to 2000 nm. However, an upper limit and a lower limit of the visible light and the near-infrared light are not necessarily limited to the wavelengths exemplified herein, and may vary to some extent according to performance and a configuration of the image capturing unit, for example.

The image capturing unit is configured to include, for example, a silicon-based sensor such as a charge coupled device (CCD) image sensor and an optical filter (color filter) that filters incident light to the sensor. For example, the image capturing unit is constituted of an image sensor in which an optical filter corresponding to any of R, G, and B is provided in each image capturing element corresponding to a pixel. Such an image sensor having the configuration including the optical filters in the plurality of colors is also referred to as a "color image sensor" hereinafter.

A color image is indicated by a combination of images of a plurality of channels. In other words, a color image is indicated by a combination of a plurality of color components. The number of channels of a color image is not particularly limited as long as it is two or more. For example, the acquisition unit 110 may be configured in such a way as to acquire a color image of three channels of R (red), G (green), and B (blue). Hereinafter, the number of channels of a color image is assumed to be "M".

A color image acquired by the acquisition unit 110 includes a first region and a second region captured with near-infrared light being further reduced from incident light than that in the first region. In other words, a color image acquired by the acquisition unit 110 includes a pixel captured based on incident light including visible light and near-infrared light, and a pixel captured with the near-infrared light being reduced from the incident light. Such a color image can be acquired by providing a predetermined filter in the color image sensor of the image capturing unit, for example.

Figure 2:
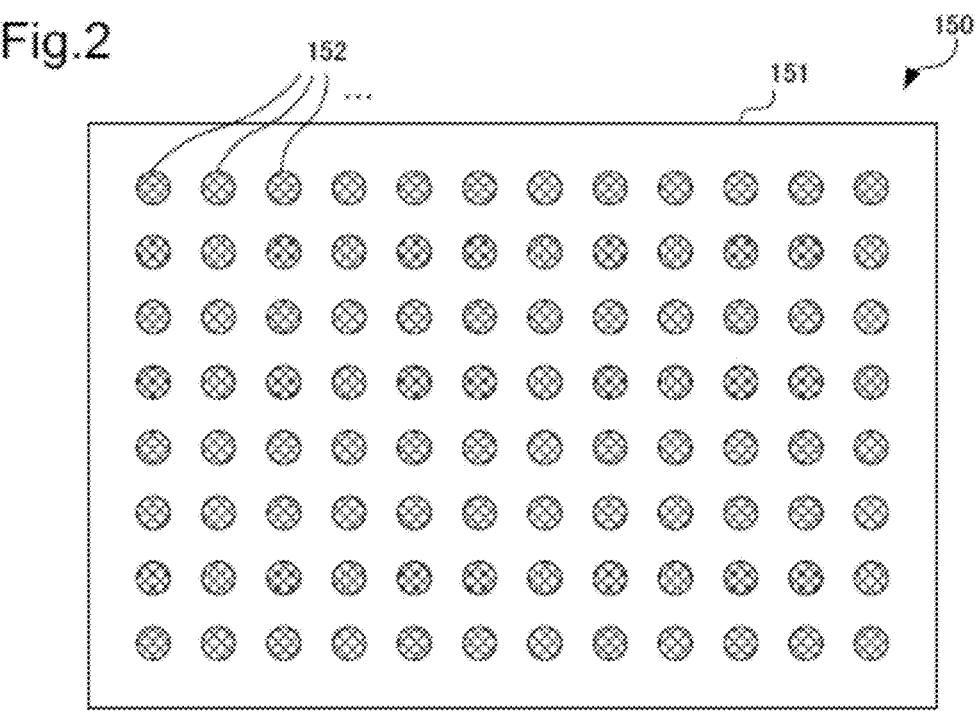
FIG. 2 is a diagram illustrating one example of a configuration of a filter.

FIG. 2 is a diagram illustrating a configuration of a filter 150 provided in a color image sensor from a side on which light is incident. The filter 150 includes a near-infrared light transmission portion 151 and a near-infrared light cut portion 152 indicated by hatching. The near-infrared light transmission portion 151 transmits visible light and near-infrared light. On the other hand, the near-infrared light cut portion 152 transmits the visible light, but is configured in such a way that a transmittance of the near-infrared light is lower than that in the near-infrared light transmission portion 151. The near-infrared light cut portions 152 are scattered at a predetermined interval in the filter 150. The arrangement of the near-infrared light cut portions 152 is not limited to specific arrangement.

The first region of the color image is a region captured with incident light transmitted through the near-infrared light transmission portion 151. On the other hand, the second region of the color image is a region captured with incident light transmitted through the near-infrared light cut portion 152.

A transmittance (spectral transmittance) for each wavelength of the visible light and the near-infrared light in the near-infrared light transmission portion 151 and the near-infrared light cut portion 152 is not limited to a specific value. However, the near-infrared light cut portion 152 is configured in such a way as to reduce the near-infrared light sufficiently (that is, to the extent that the near-infrared light does not substantially affect color information) as compared to the near-infrared light transmission portion 151. Hereinafter, it is assumed for convenience of description that the near-infrared light cut portion 152 completely blocks the near-infrared light. In other words, it is assumed that incident light transmitted through the near-infrared light cut portion 152 does not include a near-infrared component.

The estimation unit 120 estimates a spectral characteristic of incident light corresponding to each pixel of the color image acquired by the acquisition unit 110. The estimation unit 120 estimates a spectral characteristic of incident light being a basis for the color image acquired by the acquisition unit 110, based on color information about the color image of M channels acquired by the acquisition unit 110, a spectral sensitivity characteristic of the image capturing unit, and information acquired by modeling the spectral characteristic of the incident light.

Herein, the color image is indicated by color components of three colors of R, G, and B. Further, it is assumed that a spectral sensitivity characteristic for each color component of the color image sensor is $C_R(\lambda)$, $C_G(\lambda)$, and $C_B(\lambda)$, and a spectral characteristic of incident light to a certain pixel of the color image sensor is $E(\lambda)$. Herein, assuming that color signals in each pixel are R, G, and B, the color signals are expressed as in Equation (1). Herein, $\lambda$ represents a wavelength of light, and may take any value in a wavelength region in which the color image sensor has sensitivity.

$$R = \int E(\lambda) C_R(\lambda) d\lambda$$

$$G = \int E(\lambda) C_G(\lambda) d\lambda$$

$$B = \int E(\lambda) C_B(\lambda) d\lambda \qquad (1)$$

The spectral sensitivity characteristic of the color image sensor can be represented by a product of a spectral sensitivity characteristic of an image sensor and a spectral transmission characteristic of an optical filter, and is already known. The spectral characteristic $E(\lambda)$ of the incident light is originally non-discrete continuous data related to a wavelength. In the present example embodiment, modeling that expresses the spectral characteristic $E(\lambda)$ of the incident light by a relatively few parameters is introduced in order to acquire the spectral characteristic $E(\lambda)$ of the incident light from the color signals R, G, and B of the image data, based on Equation (1).

Specifically, the spectral characteristic $E(\lambda)$ of the incident light can be modeled by a weighted sum (sum having a weight) of an average vector (also referred to as an "average function") and several basis vectors (also referred to as "basis functions") by using a known limited dimensional linear model. The average vector and the basis vector can be acquired by performing a principal component analysis, based on many different spectral characteristics of incident light, for example. By such modeling, the spectral characteristic $E(\lambda)$ of the incident light being originally continuous data can be reproduced with a relatively few parameters. Herein, the number of basis vectors to be added (namely, the number of dimensions) is not particularly limited, but the spectral characteristic $E(\lambda)$ can be reproduced without greatly impairing original information generally with about two to four. In other words, a basis vector of a high order has a small contribution to the spectral characteristic $E(\lambda)$.

As one example, it is assumed herein that the number i of basis vectors is equal to the number of colors of the optical filter, namely, the number (M) of channels of the color image. In other words, the number of basis vectors (namely, a maximum value of i) when the color image is indicated by the color components of the three colors of R, G, and B is "three". When M=3, the spectral characteristic $E(\lambda)$ of the incident light is modeled as in Equation (2) on the assumption that the average vector is $r_0(\lambda)$, and the basis vector is $r_i(\lambda)$ (i=1, 2, and 3)

$$E(\lambda) = r_0(\lambda) + a_1 r_1(\lambda) + a_2 r_2(\lambda) + a_3 r_3(\lambda) \qquad (2)$$

The basis vector $r_i(\lambda)$ is a function that expresses a spectral characteristic of incident light. The basis vector $r_i(\lambda)$ is acquired by performing a principal component analysis on a spectral space formed by a product of a spectral characteristic of a light source and a surface reflectance of an object. Such a basis vector $r_i(\lambda)$ can express a spectral characteristic of incident light by a few parameters.

When Equation (2) is substituted into Equation (1), an observation equation related to an unknown parameter $a_i$ expressed in Equation (3) can be acquired. Herein, an integration constant on a right side of Equation (3) is omitted in order to simplify description.

$$R = \int (r_0(\lambda) + \Sigma_{i=1}^3 a_i r_i(\lambda)) C_R(\lambda) d\lambda$$

$$G = \int (r_0(\lambda) + \Sigma_{i=1}^3 a_i r_i(\lambda)) C_G(\lambda) d\lambda$$

$$B = \int (r_0(\lambda) + \Sigma_{i=1}^3 a_i r_i(\lambda)) C_B(\lambda) d\lambda \qquad (3)$$

An integration of Equation (3) can approximate to a sum total expressed in Equation (4). Herein, $\lambda 1$ represents a lower limit in a wavelength region of visible light. Further, $\lambda 2$ represents an upper limit in a wavelength region of near-infrared light. $\lambda 1$ and $\lambda 2$ depend on a spectral sensitivity characteristic of a color image sensor. Further, a pitch (stride) of $\lambda$ also depends on a color image sensor to be used, and is, for example, 1 nm or 10 nm. Note that it is assumed that the basis vector $r_i(\lambda)$ is defined in a section from the wavelength regions $\lambda 1$ to $\lambda 2$ of the spectral sensitivity characteristic of the color image sensor.

$$R = \Sigma_{\lambda=\lambda 1}^{\lambda 2} ((r_0(\lambda) + \Sigma_{i=1}^3 a_i r_i(\lambda)) C_R(\lambda))$$

$$G = \Sigma_{\lambda=\lambda 1}^{\lambda 2} ((r_0(\lambda) + \Sigma_{i=1}^3 a_i r_i(\lambda)) C_G(\lambda))$$

$$B = \Sigma_{\lambda=\lambda 1}^{\lambda 2} ((r_0(\lambda) + \Sigma_{i=1}^3 a_i r_i(\lambda)) C_B(\lambda)) \qquad (4)$$

In a case where color information, namely, a color signal (R, G, and B) of each color component is acquired from image data, the observation equation in Equation (4) is a simultaneous ternary linear equation related to the unknown parameter $a_i$. Then, the spectral characteristic $E(\lambda)$ of the incident light of each pixel can be estimated by substituting the parameter $a_i$ (i=1, 2, and 3) acquired by Equation (4) into Equation (2). Therefore, the estimation unit 120 can acquire the spectral characteristic of the incident light for all the pixels by solving the observation equation in Equation (4) for all the pixels of the image data.

Next, a case where the number of basis vectors is greater than the number (M) of channels of a color image by one, which is "M+1", is considered. When the number of basis vectors is "M+1", it can be said that reproducibility of a spectral characteristic of incident light is further increased than that when the number of basis vectors is "M". Also, in this case, the estimation unit 120 can estimate the spectral characteristic of the incident light as follows. The number of basis vectors (namely, a maximum value of i) when the color image is indicated by the color components of the three colors of R, G, and B is "4". In this case, the spectral characteristic $E(\lambda)$ of the incident light is modeled as in Equation (5). Equation (5) is acquired by adding $a_4 r_4(\lambda)$ to the spectral characteristic $E(\lambda)$ expressed in Equation (2).

$$E(\lambda) = r_0(\lambda) + a_1 r_1(\lambda) + a_2 r_2(\lambda) + a_3 r_3(\lambda) + a_4 r_4(\lambda) \quad (5)$$

The observation equation acquired from Equation (5) is expressed as in Equation (6) similarly to Equation (3).

$$R = \int (r_0(\lambda) + \Sigma_{i=1}^4 a_i r_i(\lambda)) C_R(\lambda) d\lambda$$

$$G = \int (r_0(\lambda) + \Sigma_{i=1}^4 a_i r_i(\lambda)) C_G(\lambda) d\lambda$$

$$B = \int (r_0(\lambda) + \Sigma_{i=1}^4 a_i r_i(\lambda)) C_B(\lambda) d\lambda \quad (6)$$

In Equation (6), the unknown parameter $a_i$ being a coefficient of the basis vector $r_i(\lambda)$ (i=1 to 4) is four, which is in a state (under determinant state) greater than three being the number in the observation equation. For this reason, the unknown parameter $a_i$ cannot be analytically solved in this way. Thus, it is assumed that a coefficient $a_1$ of the basis vector $r_1(\lambda)$ is previously acquired by a different method. One example of the method is described below.

Figure 3B:
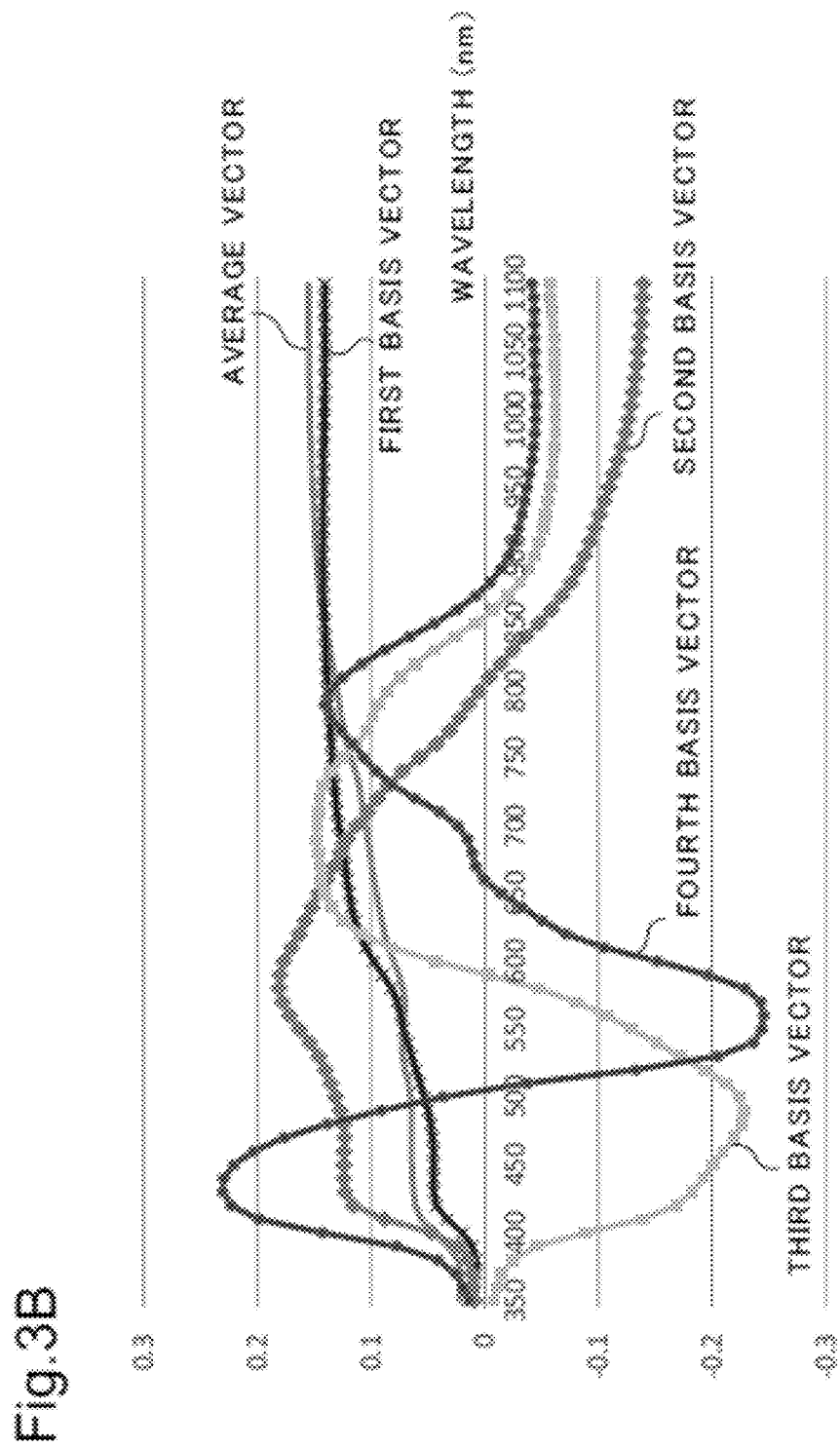
FIG. 3B is a diagram illustrating another example of an average vector and a basis vector.

FIGS. 3A and 3B are diagrams illustrating one example of an average vector $r_0(\lambda)$ and a basis vector $r_i(\lambda)$. The average vector $r_0(\lambda)$ and the basis vector $r_i(\lambda)$ are both represented by a function of $\lambda$. As described above, the basis vector $r_i(\lambda)$ can be acquired by performing a principal component analysis on a spectral space formed by a product of a spectral distribution characteristic of a light source and a surface reflectance of an object.

As illustrated in FIGS. 3A and 3B, a first basis vector $r_1(\lambda)$ of incident light is positive in the entire region of a wavelength range being illustrated, and indicates a relatively smooth line with a few fluctuations. It can be said from such a characteristic that a coefficient of the first basis vector $r_1(\lambda)$ corresponds to a coefficient for representing intensity of the incident light.

Figure 4:
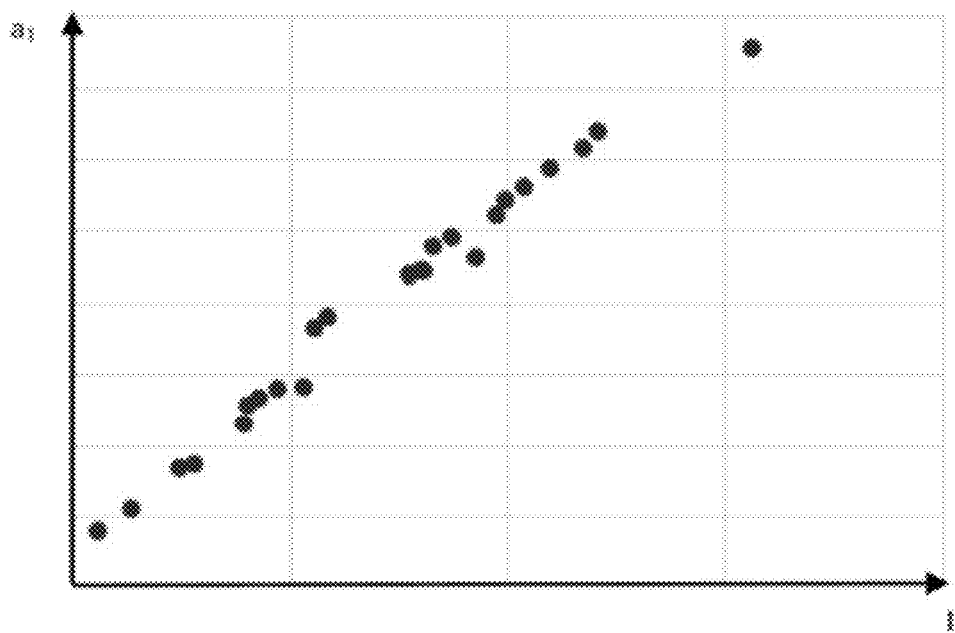
FIG. 4 is a diagram illustrating one example of a relationship between a coefficient of a first basis vector and intensity of incident light.

FIG. 4 is a diagram illustrating a relationship between the coefficient $a_1$ of the first basis vector $r_1(\lambda)$ acquired by using the actual spectral characteristic of the incident light and intensity I of the incident light. Herein, the intensity I of the incident light may be represented by brightness of the incident light, and may be represented by a sum total of image data of three channels. In the example in FIG. 4, a correlation coefficient (Pearson's correlation coefficient) between the coefficient $a_1$ and the intensity I is "0.98". Therefore, it can be said that there is an extremely strong positive correlation between the coefficient $a_1$ and the intensity I.

With a focus on this property, a sum total of image data of three channels and a regression equation related to the coefficient $a_1$ of the basis vector $r_1(\lambda)$ can be acquired by a simple linear regression analysis, for example. The coefficient $a_1$ of the basis vector $r_1(\lambda)$ can be acquired by substituting the sum total of the image data of the three channels into this regression equation.

Then, the under determinant problem is solved and the simultaneous ternary linear equation is acquired by substituting $a_1$ calculated by this method into Equation (6), and the remaining unknown parameter $a_i$ (i=2 to 4) can be acquired. The estimation unit 120 can restore the spectral characteristic $E(\lambda)$ of the incident light to a corresponding pixel in the image data by substituting the parameter $a_i$ acquired in this way into Equation (5).

The generation unit 130 generates a visible image and a near-infrared image. The generation unit 130 generates the visible image and the near-infrared image, based on the spectral characteristic of the incident light estimated by the estimation unit 120 and a spectral sensitivity characteristic of the image capturing unit. Specifically, the generation unit 130 generates the visible image and the near-infrared image as follows.

For example, it is assumed that, among spectral sensitivity characteristics $C_R(\lambda)$, $C_G(\lambda)$, and $C_B(\lambda)$ of a color image sensor, spectral sensitivity characteristics in a visible region are $C_{R\_VIS}(\lambda)$, $C_{G\_VIS}(\lambda)$, and $C_{B\_VIS}(\lambda)$. Then, color signals $R_{VIS}$, $G_{VIS}$, and $B_{VIS}$ by a visible light component are calculated by Equation (7) when the basis vectors are three, and are calculated by Equation (8) when the basis vectors are four. Herein, $\lambda 3$ represents an upper limit in a wavelength region of visible light (lower limit in a wavelength region of near-infrared light). $\lambda 3$ satisfies $\lambda 1 < \lambda 3 < \lambda 2$.

$$R_{VIS} = \Sigma_{\lambda=\lambda 1}^{\lambda 3}((r_0(\lambda) + \Sigma_{i=1}^3 a_i r_i(\lambda)) C_{R\_VIS}(\lambda))$$

$$G_{VIS} = \Sigma_{\lambda=\lambda 1}^{\lambda 3}((r_0(\lambda) + \Sigma_{i=1}^3 a_i r_i(\lambda)) C_{G\_VIS}(\lambda))$$

$$B_{VIS} = \Sigma_{\lambda=\lambda 1}^{\lambda 3}((r_0(\lambda) + \Sigma_{i=1}^3 a_i r_i(\lambda)) C_{B\_VIS}(\lambda)) \quad (7)$$

$$R_{VIS} = \Sigma_{\lambda=\lambda 1}^{\lambda 3}((r_0(\lambda) + \Sigma_{i=1}^4 a_i r_i(\lambda)) C_{R\_VIS}(\lambda))$$

$$G_{VIS} = \Sigma_{\lambda=\lambda 1}^{\lambda 3}((r_0(\lambda) + \Sigma_{i=1}^4 a_i r_i(\lambda)) C_{G\_VIS}(\lambda))$$

$$B_{VIS} = \Sigma_{\lambda=\lambda 1}^{\lambda 3}((r_0(\lambda) + \Sigma_{i=1}^4 a_i r_i(\lambda)) C_{B\_VIS}(\lambda)) \quad (8)$$

The generation unit 130 can generate image data $I_R$, $I_G$, and $I_B$ by a visible light component of each color component by generating the color signals $R_{VIS}$, $G_{VIS}$, and $B_{VIS}$ for all the pixels constituting the color image. The image data $I_R$, $I_G$, and $I_B$ are image data indicating a visible image.

Further, the generation unit 130 calculates color signals $R_{NIR}$, $G_{NIR}$, and $B_{NIR}$ by a near-infrared light component by Equation (9) when the basis vectors are three, and by Equation (10) when the basis vectors are four on the assumption that spectral sensitivity characteristics in a near-infrared region are $C_{R\_NIR}(\lambda)$, $C_{G\_NIR}(\lambda)$, and $C_{B\_NIR}(\lambda)$ among the spectral sensitivity characteristics $C_R(\lambda)$, $C_G(\lambda)$, and $C_B(\lambda)$ of the color image sensor.

$$R_{NIR} = \Sigma_{\lambda=\lambda 3}^{\lambda 2}((r_0(\lambda) + \Sigma_{i=1}^3 a_i r_i(\lambda)) C_{R\_NIR}(\lambda))$$

$$G_{NIR} = \Sigma_{\lambda=\lambda 3}^{\lambda 2}((r_0(\lambda) + \Sigma_{i=1}^3 a_i r_i(\lambda)) C_{G\_NIR}(\lambda))$$

$$B_{NIR} = \Sigma_{\lambda=\lambda 3}^{\lambda 2}((r_0(\lambda) + \Sigma_{i=1}^3 a_i r_i(\lambda)) C_{B\_NIR}(\lambda)) \quad (9)$$

$$R_{NIR} = \Sigma_{\lambda=\lambda 3}^{\lambda 2}((r_0(\lambda) + \Sigma_{i=1}^4 a_i r_i(\lambda)) C_{R\_NIR}(\lambda))$$

$$G_{NIR} = \Sigma_{\lambda=\lambda 3}^{\lambda 2}((r_0(\lambda) + \Sigma_{i=1}^4 a_i r_i(\lambda)) C_{G\_NIR}(\lambda))$$

$$B_{NIR} = \Sigma_{\lambda=\lambda 3}^{\lambda 2}((r_0(\lambda) + \Sigma_{i=1}^4 a_i r_i(\lambda)) C_{B\_NIR}(\lambda)) \quad (10)$$

Note that the color signals $R_{NIR}$, $G_{NIR}$, and $B_{NIR}$ by the near-infrared light component may be calculated by subtracting the color signals $R_{VIS}$, $G_{VIS}$, and $B_{VIS}$ by the visible light component from the color signals R, G, and B of the input image data.

The generation unit 130 can generate image data $I_{NIR}$ by the near-infrared light component by generating the color signals $R_{NIR}$, $G_{NIR}$, and $B_{NIR}$ for all the pixels constituting the color image and adding them for each of the pixels. The image data $I_{NIR}$ are image data indicating a near-infrared image.

The correction unit 140 corrects the visible image and the near-infrared image generated by the generation unit 130. The correction unit 140 corrects the visible image and the near-infrared image, based on color information in the second region of the color image. For example, the correction unit 140 can correct the visible image and the near-infrared image as follows.

For example, the color image captured by using the filter 150 illustrated in FIG. 2 includes a pixel from which a pixel value is generated by blocking a near-infrared light component included in incident light by the near-infrared light cut portion 152. Which coordinates of the color image such a pixel is located in can be previously specified by known calibration. The correction unit 140 corrects the image data $I_R$, $I_G$, and $I_B$ by the visible light component and the image data $I_{NIR}$ by the near-infrared light component, based on color information about such a pixel that does not include the near-infrared light component.

It is assumed now that color signals in coordinates K of the pixel that does not include the near-infrared light component in the captured color image are ($R0_K$, $G0_K$, $B0_K$, $NIR0_K$ ($NIR0_K=0$)). Further, it is assumed that color signals corresponding to the pixel that does not include the near-infrared light component in the image data $I_R$, $I_G$, $I_B$, and $I_{NIR}$ acquired by the generation unit 130 are ($R1_K$, $G1_K$, $B1_K$, $NIR1_K$). Herein, when there is a difference between the actual values ($R0_K$, $G0_K$, $B0_K$) and ($R1_K$, $G1_K$, $B1_K$) of the visible light component, it means that an error is included in ($R1_K$, $G1_K$, $B1_K$). Minimizing this error corresponds to optimization in such a way as to improve accuracy of the pixel value of the image data $I_R$, $I_G$, and $I_B$. As one example of correction processing on ($R1_K$, $G1_K$, $B1_K$), a correction matrix expressed in Equation (11) can be used.

$$\begin{pmatrix} R1_K' \\ G1_K' \\ B1_K' \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} R1_K \\ G1_K \\ B1_K \end{pmatrix} \quad (11)$$

The correction unit 140 calculates a correction matrix M that minimizes an error between a pixel value ($R1_K'$, $G1_K'$, $B1_K'$) after the correction processing expressed in Equation (11) and ($R0_K$, $G0_K$, $B0_K$) being a true value. In order to determine the correction matrix M, the correction unit 140 selects at least three or more pixels from pixels based on the incident light transmitted through the near-infrared light cut portion 152 of the filter 150 in FIG. 2 in the color image, namely, pixels from which a pixel value is generated based on the incident light that does not include the near-infrared light component. It is assumed that the three or more pixels selected at this time are selected in such a way as to vary in hue from each other. The correction unit 140 acquires a set of ($R0_K$, $G0_K$, $B0_K$) and ($R1_K$, $G1_K$, $B1_K$) corresponding to the selected pixels. When the three pixels are selected now, an observation equation for calculating the correction matrix M is expressed as in Equation (12).

$$\begin{pmatrix} R0_1 \\ G0_1 \\ B0_1 \\ R0_2 \\ G0_2 \\ B0_2 \\ R0_3 \\ G0_3 \\ B0_3 \end{pmatrix} = \quad (12)$$

$$\begin{pmatrix} R1_1 & G1_1 & B1_1 & 0 & 0 & 0 & 0 & 0 & 0 \\ 0 & 0 & 0 & R1_1 & G1_1 & B1_1 & 0 & 0 & 0 \\ 0 & 0 & 0 & 0 & 0 & 0 & R1_1 & G1_1 & B1_1 \\ R1_2 & G1_2 & B1_2 & 0 & 0 & 0 & 0 & 0 & 0 \\ 0 & 0 & 0 & R1_2 & G1_2 & B1_2 & 0 & 0 & 0 \\ 0 & 0 & 0 & 0 & 0 & 0 & R1_2 & G1_2 & B1_2 \\ R1_3 & G1_3 & B1_3 & 0 & 0 & 0 & 0 & 0 & 0 \\ 0 & 0 & 0 & R1_3 & G1_3 & B1_3 & 0 & 0 & 0 \\ 0 & 0 & 0 & 0 & 0 & 0 & R1_3 & G1_3 & B1_3 \end{pmatrix} \begin{pmatrix} m_{11} \\ m_{12} \\ m_{13} \\ m_{21} \\ m_{22} \\ m_{23} \\ m_{31} \\ m_{32} \\ m_{33} \end{pmatrix}$$

In Equation (12), $m_{11}$ to $m_{33}$ represent elements of the correction matrix M. The correction unit 140 can calculate the correction matrix M by calculating an inverse matrix of a matrix with 9 rows and 9 columns on a right side of Equation (12) and multiplying both sides by the inverse matrix. Note that the inverse matrix of the matrix with 9 rows and 9 columns on the right side of Equation (12) can be calculated when the three or more pixels are selected in such a way as to vary in hue from each other as described above.

Note that, in the correction, the correction unit 140 may select four or more (namely, four or more colors of) pixels. The correction matrix M varies according to the number of selected colors. For example, an observation equation when the number of colors is p is expressed by Equation (13). In Equation (13), the number of equations is greater than the number of unknowns. Thus, the correction unit 140 calculates the correction matrix M by using a least squares method.

$$\begin{pmatrix} R0_1 \\ G0_1 \\ B0_1 \\ R0_2 \\ G0_2 \\ B0_2 \\ \vdots \\ R0_p \\ G0_p \\ B0_p \end{pmatrix} = \quad (13)$$

$$\begin{pmatrix} R1_1 & G1_1 & B1_1 & 0 & 0 & 0 & 0 & 0 & 0 \\ 0 & 0 & 0 & R1_1 & G1_1 & B1_1 & 0 & 0 & 0 \\ 0 & 0 & 0 & 0 & 0 & 0 & R1_1 & G1_1 & B1_1 \\ R1_2 & G1_2 & B1_2 & 0 & 0 & 0 & 0 & 0 & 0 \\ 0 & 0 & 0 & R1_2 & G1_2 & B1_2 & 0 & 0 & 0 \\ 0 & 0 & 0 & 0 & 0 & 0 & R1_2 & G1_2 & B1_2 \\ \vdots & \vdots & \vdots & \vdots & \vdots & \vdots & \vdots & \vdots & \vdots \\ R1_p & G1_p & B1_p & 0 & 0 & 0 & 0 & 0 & 0 \\ 0 & 0 & 0 & R1_p & G1_p & B1_p & 0 & 0 & 0 \\ 0 & 0 & 0 & 0 & 0 & 0 & R1_p & G1_p & B1_p \end{pmatrix} \begin{pmatrix} m_{11} \\ m_{12} \\ m_{13} \\ m_{21} \\ m_{22} \\ m_{23} \\ m_{31} \\ m_{32} \\ m_{33} \end{pmatrix}$$

The correction unit 140 acquires the pixel value ($R1_K'$, $G1_K'$, $B1_K'$) after the correction performed on ($R1_K$, $G1_K$, $B1_K$) in the coordinates K of the pixel that does not include the near-infrared light component in the color image by substituting the correction matrix M calculated from the observation equation of Equation (12) or Equation (13) into Equation (11). Then, the correction unit 140 sets a pixel value $NIR1_{X}'$ after the correction of $NIR1_K$ to zero. In this way, the correction, namely, the optimization of the pixel value by the correction unit 140 is terminated.

When the pixel that does not include the near-infrared light component in the color image is located in coordinates X, $(R1_{X}', G1_{X}', B1_{X}')$ is acquired for a pixel value $(R1_X, G1_X, B1_X)$ of the pixel by applying the correction processing according to Equation (11). The correction unit 140 performs calculation for $NIR1_{X}'$ by using Equation (14) in such a way that a sum total of pixel values is equal before and after the correction. Note that when $NIR1_{X}'$ is negative, the correction unit 140 may set $NIR1_{X}'$ to "0".

$$NIR1_{X}'=(R1_X+G1_X+B1_X+NIR1_X)-(R1_{X}'+G1_{X}'+B1_{X}') \quad (14)$$

Figure 5:
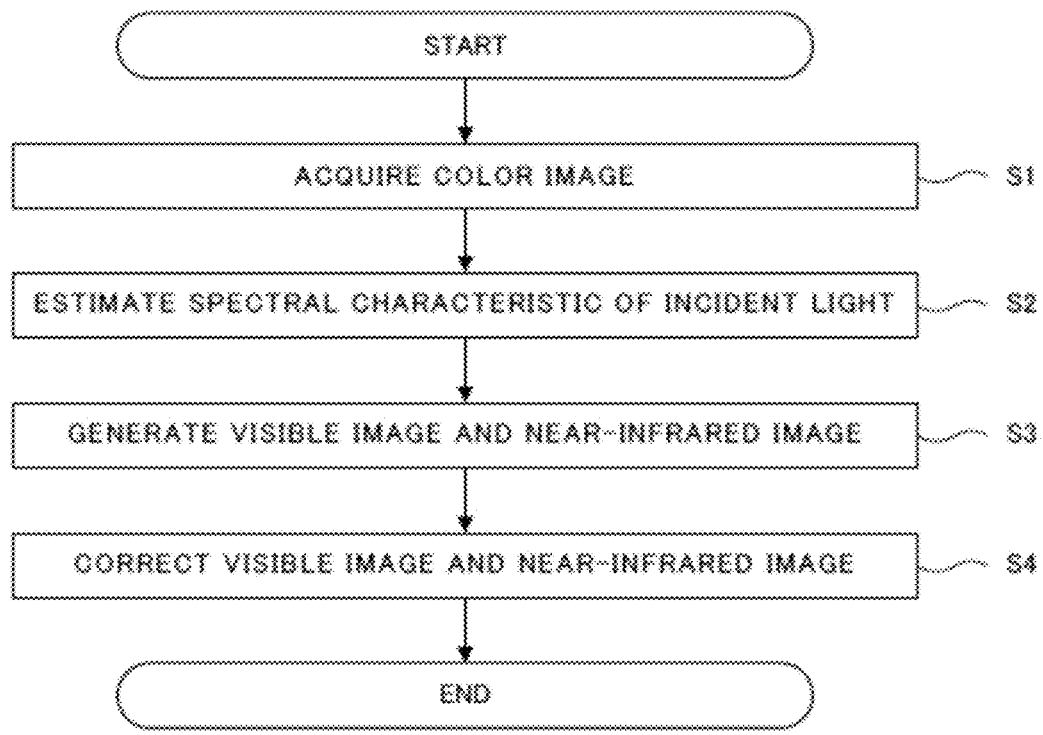
FIG. 5 is a flowchart illustrating one example of image processing performed by the image processing device.

FIG. 5 is a flowchart illustrating image processing performed by the image processing device 100. In Step S1, the acquisition unit 110 acquires a color image of M channels including the first region and the second region described above. In Step S2, the estimation unit 120 estimates a spectral characteristic of incident light, based on color information about the color image of the M channels acquired in Step S1, a spectral sensitivity characteristic of the image capturing unit, and information acquired by modeling the spectral characteristic of the incident light. In Step S3, the generation unit 130 generates a visible image and a near-infrared image, based on the spectral characteristic of the incident light estimated in Step S2 and a spectral sensitivity characteristic of the image capturing unit. In Step S4, the correction unit 140 corrects the visible image and the near-infrared image generated in Step S3, based on color information in the second region of the color image.

As described above, the image processing device 100 in the present example embodiment has a configuration that estimates a spectral characteristic of incident light, based on color information about a color image, a spectral sensitivity characteristic of an image capturing unit, and information acquired by modeling the spectral characteristic of the incident light. This configuration allows a visible image and a near-infrared image to be generated by one capturing without having a configuration that reads a visible light component and a near-infrared light component with different image sensors and a configuration that mechanically moves an optical filter. Therefore, the image processing device 100 in the present example embodiment can generate a visible image and a near-infrared image with a simple configuration without requiring such special configurations.

Further, the image processing device 100 in the present example embodiment has a configuration that corrects a visible image and a near-infrared image, based on a color image including a second region captured with near-infrared light being further reduced from incident light than that in a first region. This configuration allows capturing of a pixel including a visible light component and a near-infrared light component and a pixel including a reduced near-infrared light component by one capturing, and also allows a visible image and a near-infrared image to be corrected by solving a so-called optimization problem. Therefore, the image processing device 100 in the present example embodiment can improve color reproducibility of a visible image as compared to a case without having such a configuration.

Second Example Embodiment

Figure 6:
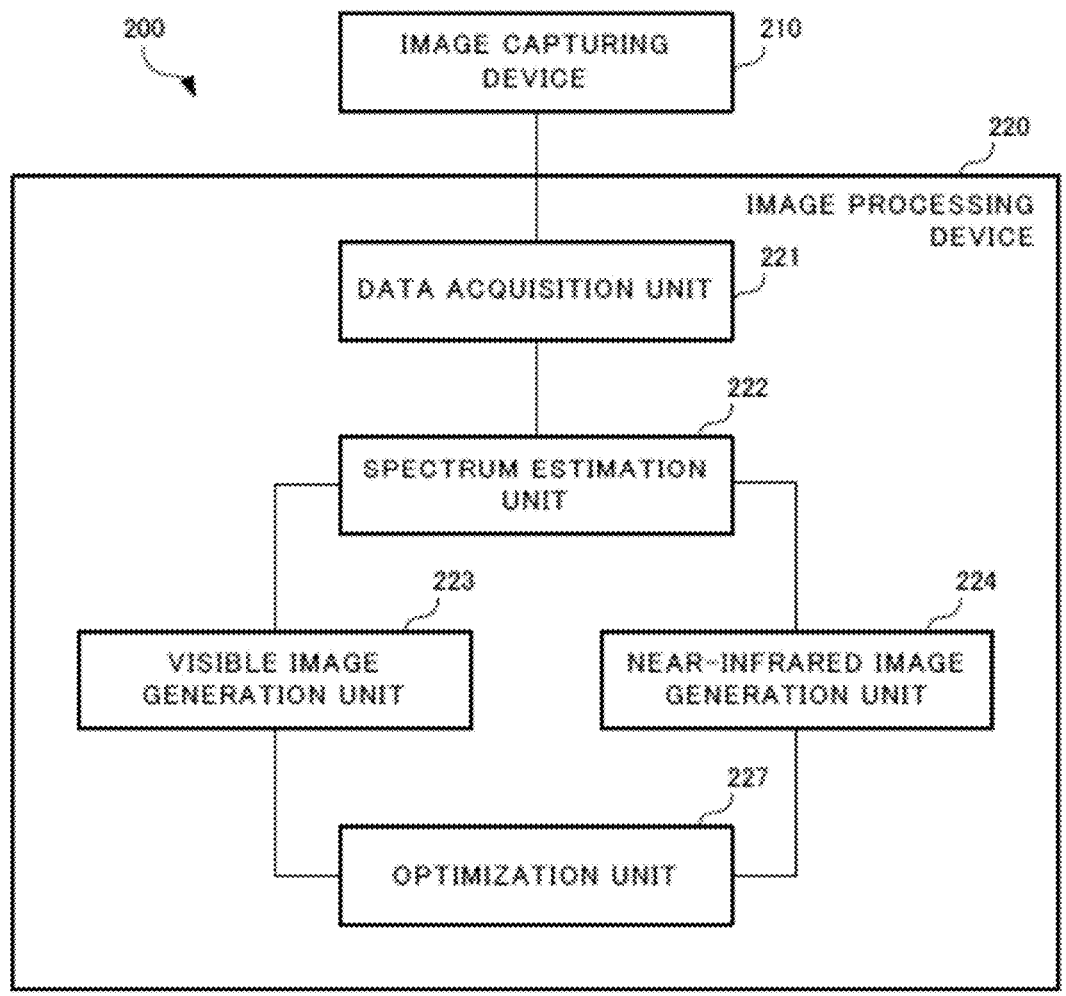
FIG. 6 is a block diagram illustrating one example of a configuration of an image processing system.

FIG. 6 is a block diagram illustrating a configuration of an image processing system 200 according to another example embodiment. The image processing system 200 is configured to include an image capturing device 210 and an image processing device 220. The image processing system 200 may include a configuration other than the image capturing device 210 and the image processing device 220. For example, the image processing system 200 may include another device that stores data supplied from the image capturing device 210 or transfers data to the image processing device 220.

The image capturing device 210 captures a subject, and generates image data. In the present example embodiment, the image capturing device 210 includes a filter including a near-infrared light cut portion such as the filter 150 exemplified in FIG. 2, and a color image sensor including optical filters in three colors of R, G, and B. The image capturing device 210 generates and outputs image data indicating a color image according to incident light. The image data is constituted of a pixel having a pixel value including a visible light component and a near-infrared light component. The image capturing device 210 may be, for example, a digital still camera. Hereinafter, an image indicated by image data generated by the image capturing device 210 is also referred to as a "captured image".

The color image sensor of the image capturing device 210 is configured in such a way as to have receiving light sensitivity in a wavelength region from visible light to near-infrared light. Further, this color image sensor can generate a captured image including a first region and a second region by transmitting incident light to the filter including the near-infrared light cut portion.

The color image sensor may generally include a filter (IR cut filter) that prevents transmission of infrared light in addition to the color filter. For example, the image capturing device 210 may be generated by replacing such an IR cut filter of the general color image sensor with the filter including the near-infrared light cut portion such as the filter 150 exemplified in FIG. 2.

Note that the visible light refers to light (electromagnetic wave) with a wavelength of 400 to 700 nm in the present example embodiment. Further, the near-infrared light refers to light (electromagnetic wave) with a wavelength of 700 to 1000 nm. In other words, $\lambda 1=400$ nm, $\lambda 2=1000$ nm, and $\lambda 3=700$ nm in the present example embodiment.

Figure 7:
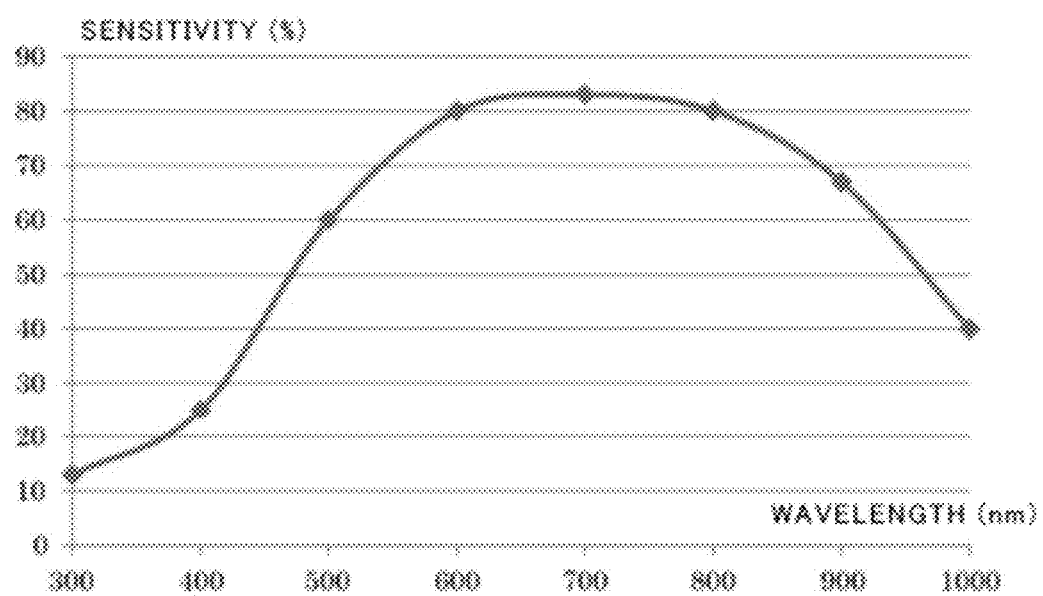
FIG. 7 is a diagram illustrating one example of a spectral sensitivity characteristic of an image sensor of an image capturing device.

FIG. 7 is a diagram illustrating one example of a spectral sensitivity characteristic of an image sensor of the image capturing device 210. As illustrated in FIG. 7, the image sensor of the image capturing device 210 has sensitivity to near-infrared light in addition to visible light.

Figure 8:
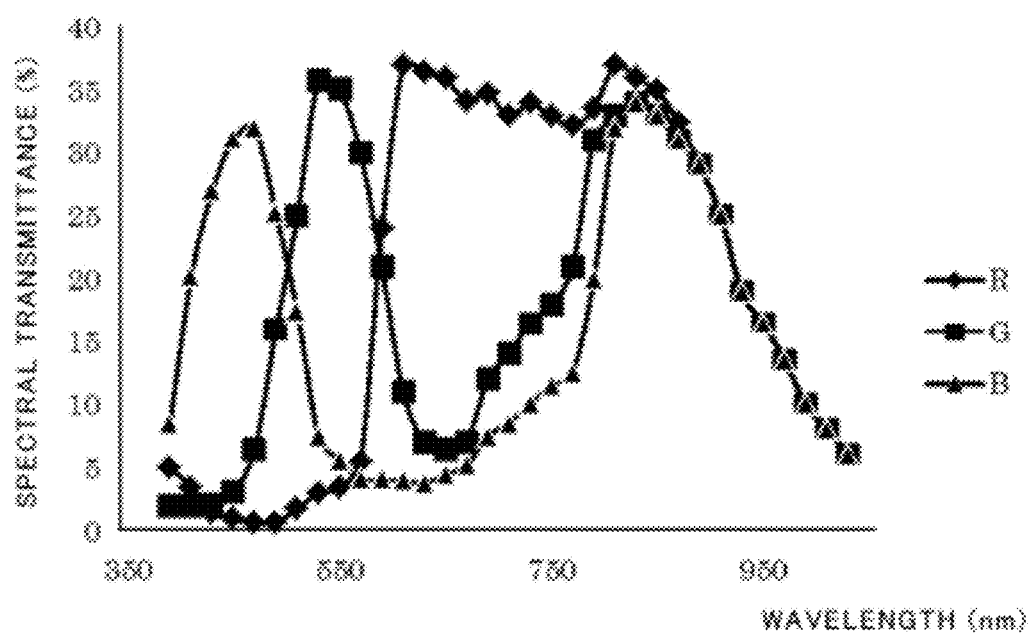
FIG. 8 is a diagram illustrating one example of a spectral transmission characteristic of an optical filter.

FIG. 8 is a diagram illustrating one example of a spectral transmission characteristic of an optical filter in each color of R, G, and B. As illustrated in FIG. 8, the optical filter of the image capturing device 210 has a characteristic of transmitting near-infrared light in addition to visible light. Note that it is assumed that the image sensor of the image capturing device 210 is configured in such a way that each pixel can receive light in any of the three colors of R, G, and B.

Figure 9:
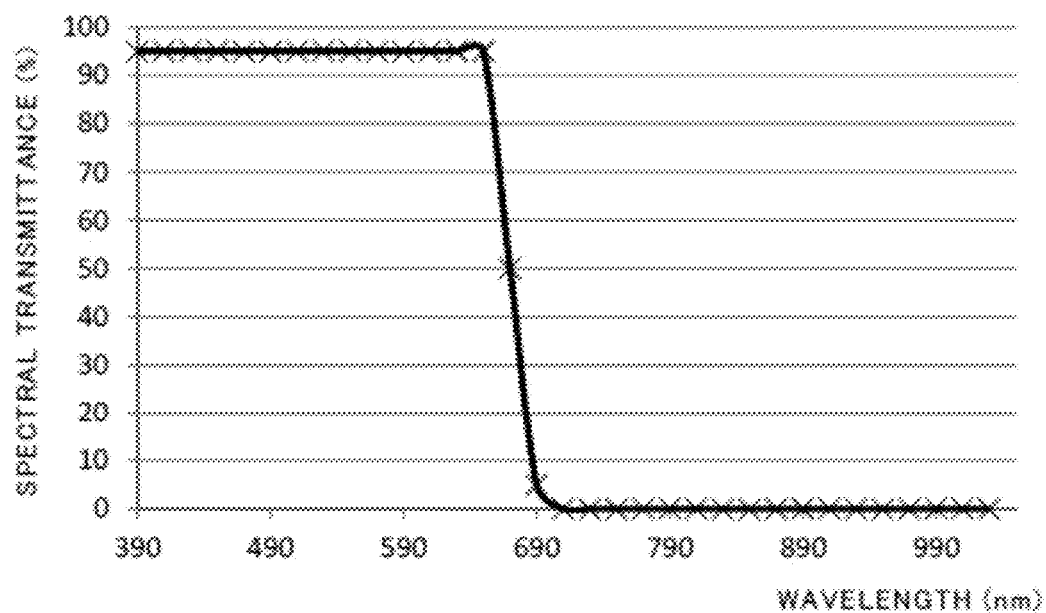
FIG. 9 is a diagram illustrating one example of a spectral transmission characteristic of an IR cut filter.

FIG. 9 is a diagram illustrating one example of a spectral transmission characteristic of an IR cut filter used for a general color image sensor. The general color image sensor enables capturing in which near-infrared light is cut, namely, capturing close to human color perception by being provided with such an IR cut filter together with a color filter.

The image processing device 220 performs image processing on image data. The image processing device 220 can generate image data corresponding to a visible image and image data corresponding to a near-infrared image, based on image data supplied from the image capturing device 210. The image processing device 220 is configured to include a data acquisition unit 221, a spectrum estimation unit 222, a visible image generation unit 223, a near-infrared image generation unit 224, and an optimization unit 227.

The data acquisition unit 221 acquires data. The data acquisition unit 221 includes, for example, a wired or wireless interface for receiving image data from the image capturing device 210. Alternatively, the data acquisition unit 221 may include a reader that reads image data stored in a storage medium. The data acquisition unit 221 corresponds to one example of the acquisition unit 110 in the first example embodiment.

The data acquisition unit 221 is configured in such a way as to acquire, in addition to the image data, data indicating a spectral sensitivity characteristic of the image capturing device 210 and data indicating coordinate information about a pixel that does not include a near-infrared light component in a captured image (hereinafter also collectively referred to as "characteristic data"). The characteristic data may be acquired in form of being embedded as metadata in the image data and in form of being associated with the image data.

The spectrum estimation unit 222 estimates a spectral characteristic of light incident on each pixel of the color image sensor of the image capturing device 210. In the present example embodiment, the spectrum estimation unit 222 estimates a spectrum of incident light. The spectrum estimation unit 222 estimates the spectrum of the incident light, based on the image data acquired by the data acquisition unit 221 and the spectral sensitivity characteristic included in the characteristic data about the image capturing device 210. The spectrum estimation unit 222 corresponds to one example of the estimation unit 120 in the first example embodiment.

The visible image generation unit 223 generates first image data indicating a visible image. The visible image generation unit 223 generates the first image data, based on the spectrum of the incident light estimated by the spectrum estimation unit 222 and the spectral sensitivity characteristic included in the characteristic data about the image capturing device 210. The visible image generation unit 223 (and the near-infrared image generation unit 224) correspond to one example of the generation unit 130 in the first example embodiment.

The near-infrared image generation unit 224 generates second image data indicating a near-infrared image. The near-infrared image generation unit 224 generates the second image data, based on the spectrum of the incident light estimated by the spectrum estimation unit 222 and the spectral sensitivity characteristic included in the characteristic data about the image capturing device 210.

Note that the first image data and the second image data herein are merely convenient distinctions. For example, the image processing device 200 may be configured in such a way as to output image data of four channels corresponding to the first image data (three channels) and the second image data (one channel).

The optimization unit 227 performs optimization in such a way as to achieve a pixel value having higher accuracy on the visible image indicated by the first image data generated in the visible image generation unit 223 and the near-infrared image indicated by the second image data. The optimization unit 227 performs optimization processing with, as inputs, the captured image, the coordinate information included in the characteristic data about the image capturing device 210, the visible image, and the near-infrared image, and generates an optimized visible image and an optimized near-infrared image. The optimization unit 227 corresponds to one example of the correction unit 140 in the first example embodiment.

The image processing system 200 has the configuration described above. The image processing device 220 theoretically operates similarly to the image processing device 100 in the first example embodiment. More specifically, the image processing device 220 performs a necessary computation on the assumption that $\lambda 1=400$ nm, $\lambda 2=1000$ nm, and $\lambda 3=700$ nm under the principles described by using Equations (1) to (14).

For example, the visible image generation unit 223 calculates color signals $R_{VIS}$, $G_{VIS}$, and $B_{VIS}$ by a visible light component by using next Equation (15), based on the modeling in Equation (2). Note that the spectral characteristic $E(\lambda)$ in Equation (2) may be replaced with that in Equation (5).

$$R_{VIS} = \Sigma_{\lambda=400}^{700}((r_0(\lambda) + \Sigma_{i=1}^{3} a_i r_i(\lambda)) C_{R\_VIS}(\lambda))$$

$$G_{VIS} = \Sigma_{\lambda=400}^{700}((r_0(\lambda) + \Sigma_{i=1}^{3} a_i r_i(\lambda)) C_{G\_VIS}(\lambda))$$

$$B_{VIS} = \Sigma_{\lambda=400}^{700}((r_0(\lambda) + \Sigma_{i=1}^{3} a_i r_i(\lambda)) C_{B\_VIS}(\lambda)) \quad (15)$$

Further, the near-infrared image generation unit 224 calculates color signals $R_{NIR}$, $G_{NIR}$, and $B_{NIR}$ by a near-infrared light component by using Equation (16). Also, the spectral characteristic $E(\lambda)$ in Equation (2) herein may be replaced with that in Equation (5). Note that an average vector $r_0(\lambda)$ and a basis vector $r_i(\lambda)$ may be similar to those in the first example embodiment.

$$R_{NIR} = \Sigma_{\lambda=700}^{1000}((r_0(\lambda) + \Sigma_{i=1}^{3} a_i r_i(\lambda)) C_{R\_NIR}(\lambda))$$

$$G_{NIR} = \Sigma_{\lambda=700}^{1000}((r_0(\lambda) + \Sigma_{i=1}^{3} a_i r_i(\lambda)) C_{G\_NIR}(\lambda))$$

$$B_{NIR} = \Sigma_{\lambda=700}^{1000}((r_0(\lambda) + \Sigma_{i=1}^{3} a_i r_i(\lambda)) C_{B\_NIR}(\lambda)) \quad (16)$$

The image processing system 200 in the present example embodiment has a configuration similar to that of the image processing device 100 in the first example embodiment. Thus, the image processing system 200 can generate a visible image and a near-infrared image with a simple configuration, similarly to the image processing device 100. Further, the image processing system 200 can improve color reproducibility of a visible image and a near-infrared image, similarly to the image processing device 100.

Third Example Embodiment

Figure 10:
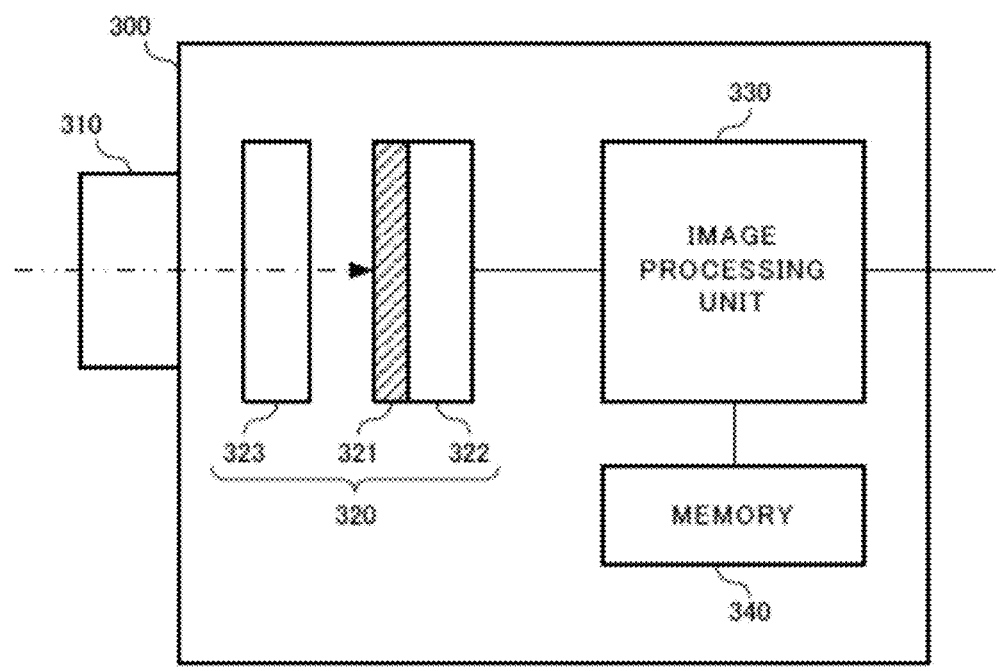
FIG. 10 is a block diagram illustrating one example of a configuration of an image capturing device.

FIG. 10 is a block diagram illustrating a configuration of an image capturing device 300 according to still another example embodiment. The image capturing device 300 is configured to include an optical system member 310, a color image sensor 320, an image processing unit 330, and a memory 340. More specifically, the color image sensor 320 includes an optical filter 321, a photosensor 322, and a filter 323.

The optical system member 310 guides light to the color image sensor 320. The optical system member 310 includes, for example, a lens and a mirror. The optical system member 310 causes visible light and near-infrared light to be incident on the color image sensor 320.

The color image sensor 320 generates image data according to incident light. The optical filter 321 is configured to include optical filters in three colors of R, G, and B. The optical filter 321 includes the optical filter in each of the colors being disposed in so-called Bayer arrangement.

Therefore, in the photosensor 322, each pixel selectively receives a color component of any of the three colors of R, G, and B.

FIG. 11 is a diagram illustrating one example of a configuration of the optical filter 321. In this example, a color filter in red (R) is provided in such a way as to correspond to a pixel in an odd row and an odd column. On the other hand, a color filter in blue (B) is provided in such a way as to correspond to a pixel in an even row and an even column. Further, a color filter in green (G) is provided in such a way as to correspond to a pixel in an odd row and an even column, and an even row and an odd column.

When the optical filter 321 has the configuration illustrated in FIG. 11, the photosensor 322 receives light (and near-infrared light) corresponding to the red in the pixel in the odd row and the odd column, and receives light (and near-infrared light) corresponding to the blue in the pixel in the even row and the even column. Further, the photosensor 322 receives light (and near-infrared light) corresponding to the green in the other pixel.

The filter 323 is a filter in which a plurality of near-infrared light cut portions are scattered similarly to the filter 150 in the first example embodiment. The filter 323 is provided on a prior stage of the optical filter 321, namely, between the optical system member 310 and the optical filter 321.

The image processing unit 330 has a configuration similar to that of the image processing device 220 in the second example embodiment. Specifically, the image processing unit 330 includes a function of acquiring image data generated by the color image sensor 320, a function of estimating a spectral characteristic of incident light, a function of generating first image data indicating a visible image, a function of generating second image data indicating a near-infrared image, and a function of optimizing (that is, correcting) the visible image and the near-infrared image. Further, the image processing unit 330 further includes a function of performing demosaicing processing on the acquired image data. Note that a wavelength region of visible light and near-infrared light in the present example embodiment follows the second example embodiment. In other words, λ1=400 nm, λ2=1000 nm, and λ3=700 nm also in the present example embodiment.

The memory 340 stores the above-described characteristic data. The memory 340 is configured to include a volatile or non-volatile storage medium. This storage medium is not limited to a storage medium of a specific kind. The characteristic data may be previously measured by using the image capturing device 300, and may be determined experimentally or empirically.

The image capturing device 300 has the configuration described above. With such a configuration, the image capturing device 300 generates first image data corresponding to a visible image and second image data corresponding to a near-infrared image, based on image data according to incident light including visible light and near-infrared light.

Since the optical filter 321 has the Bayer arrangement, each pixel is constituted of only a single color component in the image data input to the image processing unit 330. Thus, the image processing unit 330 performs demosaicing processing. As the demosaicing processing, a plurality of algorithms such as a linear interpolation method, a gradient method, and an advanced color plane interpolation (ACPI) method. For example, the image processing unit 330 performs the demosaicing processing as follows. However, the demosaicing processing performed by the image processing unit 330 is not limited to a specific algorithm.

Herein, it is assumed that coordinates of a pixel in an i-th row and a j-th column is (i, j) with reference to FIG. 11. Further, it is assumed that color signals of respective channels in the coordinates (i, j) are R(i, j), G(i, j), and B(i, j). For convenience of description, R(i, j), G(i, j), and B(i, j) are also referred to as an "R value", a "G value", and a "B value" below, respectively.

For example, a pixel having coordinates (1, 1) is a pixel corresponding to the red. Therefore, as expressed in Equation (17), a color signal having the coordinates (1, 1) is used without any change as the R value of the coordinates (1, 1).

$$R(1,1)=R(1,1) \qquad (17)$$

On the other hand, the G value and the B value having the coordinates (1, 1) cannot be directly acquired from color signals having the coordinates. Thus, as expressed in Equations (18) and (19), for example, the G value and the B value having the coordinates (1, 1) are acquired by interpolation from a color signal of a pixel in the same color in the vicinity.

$$G(1, 1) = \frac{G(1, 2) + G(2, 1)}{2} \qquad (18)$$

$$B(1, 1) = B(2, 2) \qquad (19)$$

Next, a pixel having coordinates (1, 2) is a pixel corresponding to the green. Therefore, as expressed in Equation (20), a color signal having the coordinates (1, 2) is used without any change as the G value of the coordinates (1, 2).

$$G(1,2)=G(1,2) \qquad (20)$$

Further, as expressed in Equations (21) and (22), for example, the R value and the B value having the coordinates (1, 2) are acquired by interpolation from a color signal of a pixel in the same color in the vicinity.

$$R(1,2)=R(1,1) \qquad (21)$$

$$B(1,2)=B(2,2) \qquad (22)$$

The image processing unit 330 also calculates the R value, the G value, and the B value by interpolation from a pixel in the same color in the vicinity similarly for another pixel. The image processing unit 330 can acquire color information of three channels for each pixel by calculating the R value, the G value, and the B value for all pixels. The processing performed after the demosaicing processing by the image processing unit 330 is similar to the processing performed by the image processing device 220 in the second example embodiment.

The image capturing device 300 in the present example embodiment has a configuration similar to that of the image processing device 220 in the second example embodiment. Thus, the image capturing device 300 can generate a visible image and a near-infrared image with a simple configuration, and improve color reproducibility of the visible image and the near-infrared image, similarly to the image processing device 220. In addition, the image capturing device 300 can generate a near-infrared image with a simple or inexpensive configuration as compared to a case where a special configuration is required for generating a near-infrared image, and thus a contribution to size reduction and improvement in reliability (due to a few faults) of a device can be expected.

Fourth Example Embodiment

Figure 12:
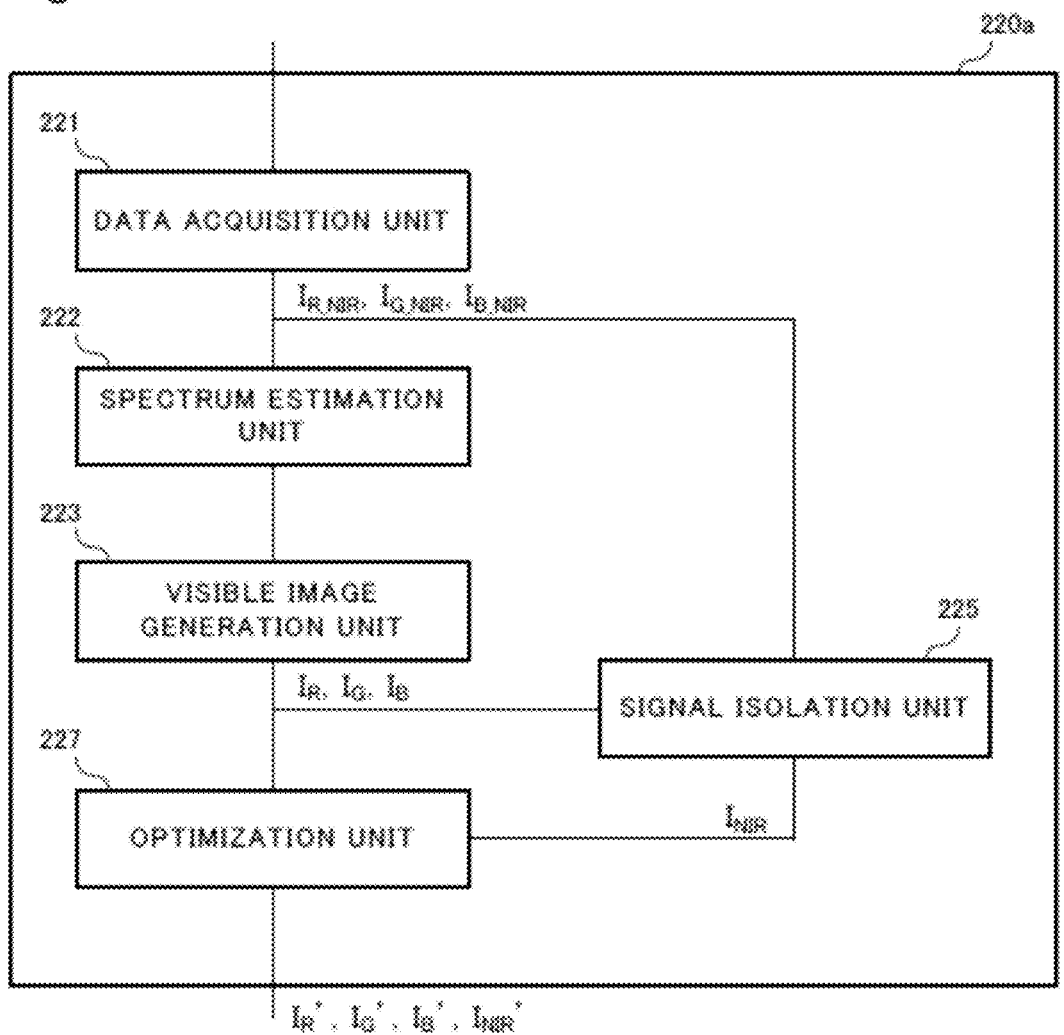
FIG. 12 is a block diagram illustrating another example of a configuration of an image processing device.

FIG. 12 is a block diagram illustrating a configuration of an image processing device 220a according to still another example embodiment. The image processing device 220a is configured to include a data acquisition unit 221, a spectrum estimation unit 222, a visible image generation unit 223, and an optimization unit 227 similar to those of the image processing device 220 in the second example embodiment. In addition, the image processing device 220a includes a signal isolation unit 225.

The signal isolation unit 225 includes a function of generating a near-infrared image. Specifically, the signal isolation unit 225 generates second image data, based on image data supplied from the data acquisition unit 221 and first image data generated by the visible image generation unit 223.

More specifically, the signal isolation unit 225 generates second image data, based on a difference between image data supplied from the data acquisition unit 221 and first image data. For example, assuming that image data of three channels (including a visible component and a near-infrared component) supplied from the data acquisition unit 221 are $I_{R\_NIR}$, $I_{G\_NIR}$, and $I_{B\_NIR}$, and first image data are $I_R$, $I_G$, and $I_B$, the signal isolation unit 225 calculates second image data $I_{NIR}$ from Equation (23). Herein, $c_{R1}$, $c_{G1}$, and $c_{B1}$ are predetermined coefficients acquired experimentally or empirically. Any of $c_{R1}$, $c_{G1}$, and $c_{B1}$ may be, for example, "1.0", which is not limited thereto.

$$I_{NIR} = \frac{I_{R\_NIR} - I_R}{c_{R1}} + \frac{I_{G\_NIR} - I_G}{c_{G1}} + \frac{I_{B\_NIR} - I_B}{c_{B1}} \quad (23)$$

The image processing device 220a in the present example embodiment has a configuration similar to that of the image processing device 220 in the second example embodiment. Thus, the image processing device 220a can generate a visible image and a near-infrared image with a simple configuration, and improve color reproducibility of the visible image and the near-infrared image, similarly to the image processing device 220. Further, the image processing device 220a can generate second image data by simple calculation such as subtraction by including the signal isolation unit 225.

Fifth Example Embodiment

Figure 13:
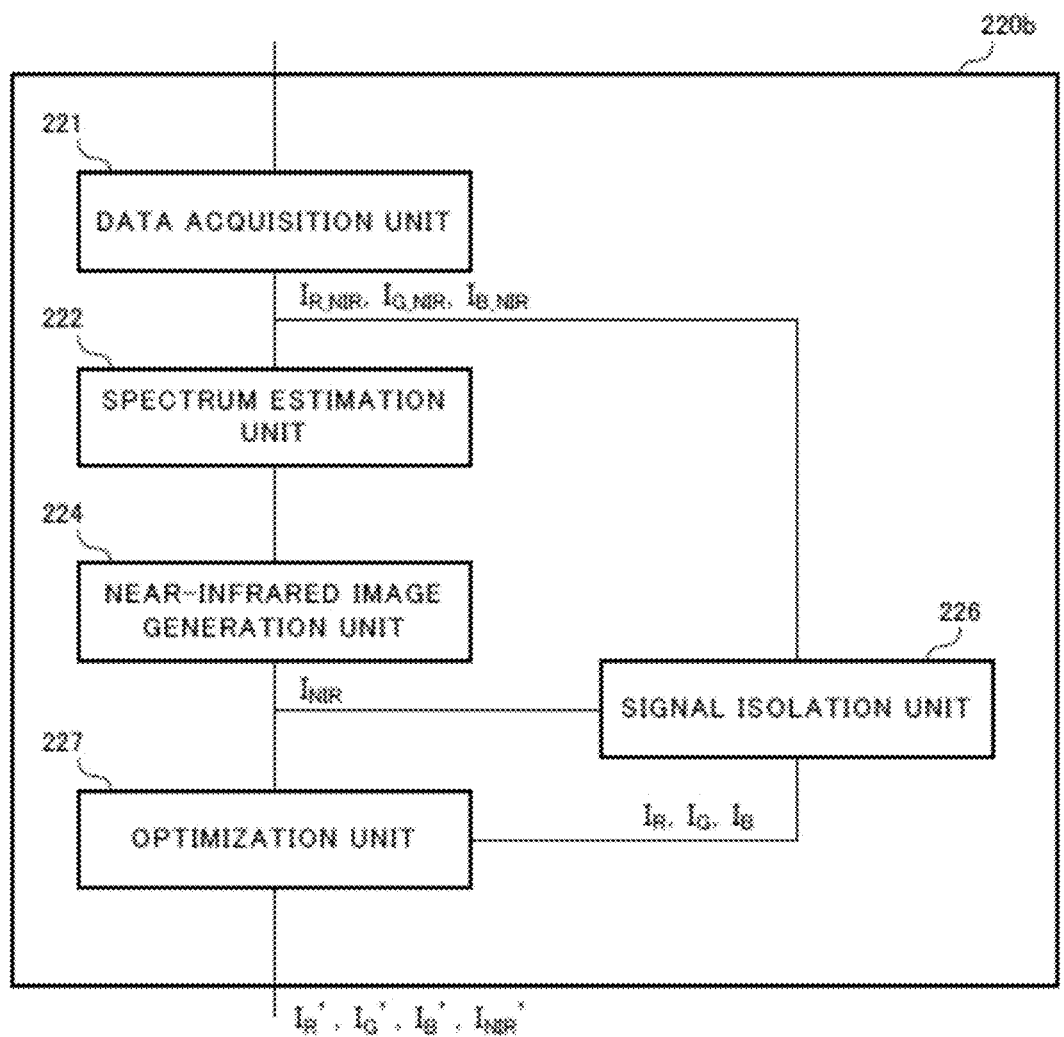
FIG. 13 is a block diagram illustrating still another example of a configuration of an image processing device.

FIG. 13 is a block diagram illustrating a configuration of an image processing device 220b according to still another example embodiment. The image processing device 220b is configured to include a data acquisition unit 221, a spectrum estimation unit 222, a near-infrared image generation unit 224, and an optimization unit 227 similar to those of the image processing device 220 in the second example embodiment. In addition, the image processing device 220b includes a signal isolation unit 226.

The signal isolation unit 226 includes a function of generating a visible image. Specifically, the signal isolation unit 226 generates first image data, based on image data supplied from the data acquisition unit 221 and second image data generated by the near-infrared image generation unit 224.

More specifically, the signal isolation unit 226 generates first image data, based on a difference between image data supplied from the data acquisition unit 221 and second image data. For example, assuming that image data of three channels (including a visible component and a near-infrared component) supplied from the data acquisition unit 221 are $I_{R\_NIR}$, $I_{G\_NIR}$, and $I_{B\_NIR}$, and second image data are $I_{NIR}$, the signal isolation unit 226 calculates first image data $I_R$, $I_G$, and $I_B$ from Equation (24). Herein, $c_{R2}$, $c_{G2}$, and $c_{B2}$ are predetermined coefficients acquired experimentally or empirically. Any of $c_{R2}$, $c_{G2}$, and $c_{B2}$ may be, for example, "1.0", which is not limited thereto.

$$I_R = I_{R\_NIR} - \frac{I_{NIR}}{c_{R2}} \quad (24)$$
$$I_G = I_{G\_NIR} - \frac{I_{NIR}}{c_{G2}}$$
$$I_B = I_{B\_NIR} - \frac{I_{NIR}}{c_{B2}}$$

The image processing device 220b in the present example embodiment has a configuration similar to that of the image processing device 220 in the second example embodiment. Thus, the image processing device 220b can generate a visible image and a near-infrared image with a simple configuration, and improve color reproducibility of the visible image and the near-infrared image, similarly to the image processing device 220. Further, the image processing device 220b can generate first image data by simple calculation such as subtraction by including the signal isolation unit 226.

Figure 14:
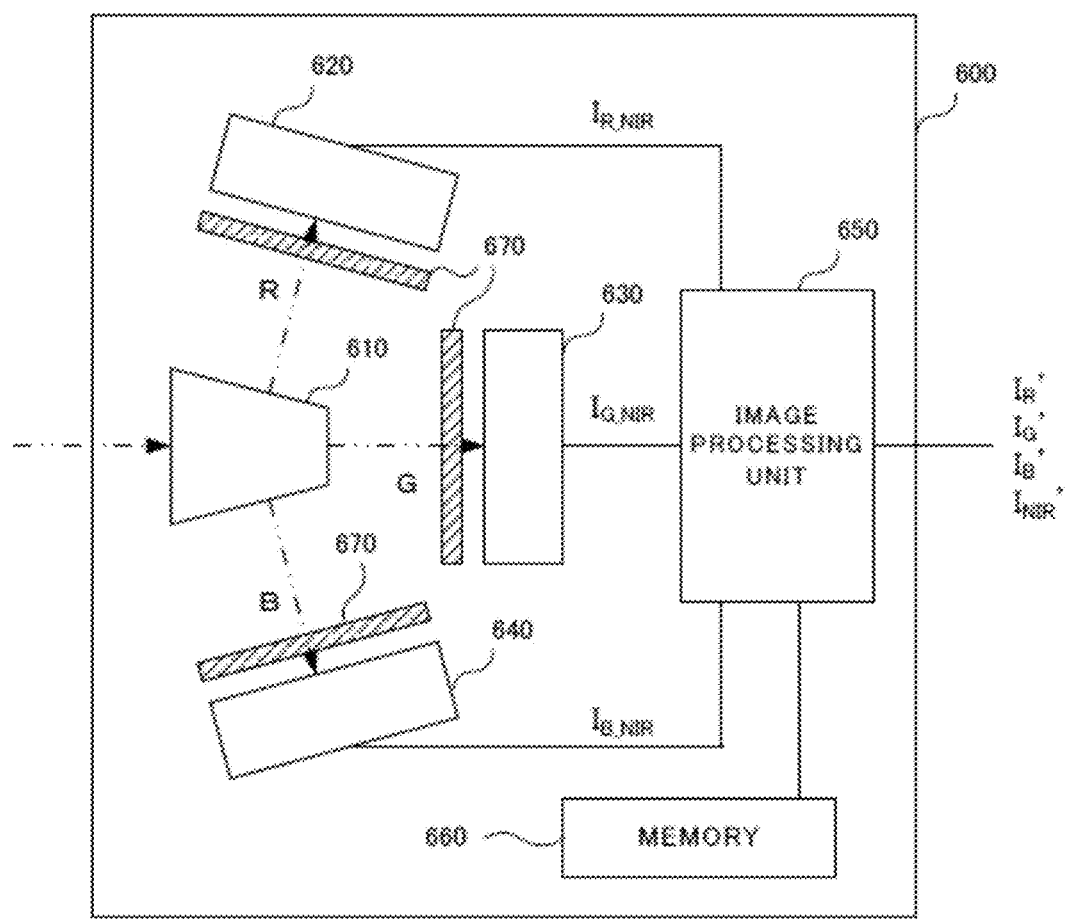
FIG. 14 is a block diagram illustrating still another example of a configuration of an image processing device.

FIG. 14 is a block diagram illustrating a configuration of an image capturing device 600 according to still another example embodiment. The image capturing device 600 is one example of a so-called multiplate-type image capturing device. In other words, the image capturing device according to the present disclosure is not limited to a single-plate type. The image capturing device 600 is configured to include a color separation unit 610, photosensors 620, 630, and 640, an image processing unit 650, a memory 660, and a filter 670.

The color separation unit 610 disperses incident light for each specific wavelength region. The color separation unit 610 is, for example, a prism. The color separation unit 610 separates incident light including a visible component and a near-infrared component into color light corresponding to each wavelength region of R, G, and B, and emits the color light. The color light emitted from the color separation unit 610 is transmitted through the filter 670, and is incident on the photo sensors 620, 630, and 640. The filter 670 is a filter in which near-infrared light cut portions are scattered. The configuration of the filter 670 may be similar to that of the filter 150 exemplified in the first example embodiment.

The photo sensors 620, 630, and 640 generate image data according to light transmitted through and incident on the filter 670. The photosensor 620 generates image data $I_{R\_NIR}$ corresponding to red. The photo sensor 630 generates image data $I_{G\_NIR}$ corresponding to green. The photosensor 640 generates image data $I_{B\_NIR}$ corresponding to blue. At least any of the image data include not only the visible component but also the near-infrared component.

The image processing unit 650 has a configuration similar to that of the image processing device 220 in the second example embodiment. In other words, the image processing unit 650 includes a function of acquiring image data ($I_{R\_NIR}$, $I_{G\_NIR}$, and $I_{B\_NIR}$) generated by the photo sensors 620, 630, and 640, a function of estimating a spectral characteristic of incident light, a function of generating first image data ($I_R$, $I_G$, and $I_B$) indicating a visible image, a function of generating second image data ($I_{NIR}$) indicating a near-infrared image, and a function of outputting image data ($I_R'$, $I_G'$, $I_B'$, and $I_{NIR}'$) acquired by correcting the first image data ($I_R$, $I_G$, and $I_B$) and the second image data ($I_{NIR}$).

The memory 660 stores characteristic data indicating a spectral sensitivity characteristic of the image capturing device 600 and coordinate information about a pixel that does not include a near-infrared light component in a captured image. The memory 660 may have a configuration similar to that of the memory 340 in the third example embodiment. However, a specific value of the characteristic data may be different from a value of the characteristic data in the third example embodiment.

The present example embodiment can generate a visible image and a near-infrared image with a simple configuration, and improve color reproducibility of the visible image and the near-infrared image, similarly to the other example embodiments. The image capturing device 600 can be achieved by replacing an IR cut filter of a general three plate-type image capturing device with the filter 670 in terms of hardware. However, the image processing performed by the image processing unit 650 includes processing different from image processing performed by the general three plate-type image capturing device.

Modification Example

The present disclosure is not limited to the above-described first example embodiment to sixth example embodiment. The present disclosure may include an aspect to which modification or application that may be understood by a person skilled in the art is applied. For example, the present disclosure includes an aspect of modification examples described below and an aspect that may be conceived from the modification examples. Further, the present disclosure may include an aspect in which matters described in the specification are appropriately combined as necessary. For example, a matter described by using a specific example embodiment may also be applied to another example embodiment within an extent that there is no inconsistency.

Modification Example 1

Both of the number of channels of a color image and a color component (namely, a wavelength region) of each channel are not limited to a specific value. For example, the number of channels of a color image may be four or more. Further, C (cyan) M (magenta) Y (yellow) may be used as color components of a color image, instead of RGB.

Modification Example 2

A specific hardware configuration of a device (such as the image processing devices 100 and 220, and the image capturing devices 300 and 600) according to the present disclosure has diverse variations, and is not limited to a specific configuration. For example, each device may be achieved by using software or configured in such a way as to share various processing by combining and using two or more devices.

Figure 15:
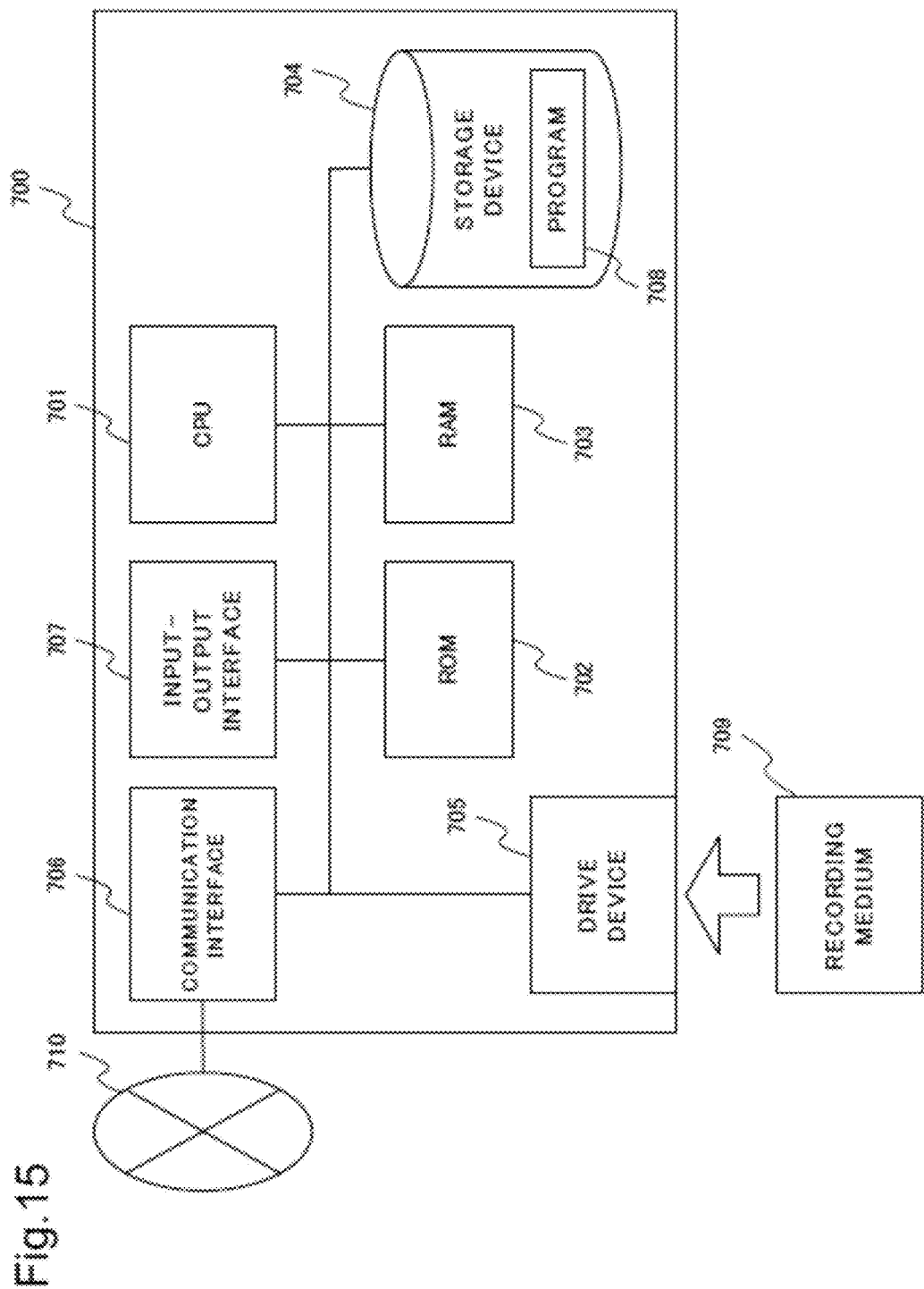
FIG. 15 is a block diagram illustrating one example of a hardware configuration of a computer device.

FIG. 15 is a block diagram illustrating one example of a hardware configuration of a computer device 700 for achieving the device according to the present disclosure. The computer device 700 is configured to include a central processing unit (CPU) 701, a read only memory (ROM) 702, a random access memory (RAM) 703, a storage device 704, a drive device 705, a communication interface 706, and an input-output interface 707. The device according to the present disclosure may be achieved by the configuration (or a part thereof) illustrated in FIG. 15.

The CPU 701 executes a program 708 by using the RAM 703. The program 708 may be stored in the ROM 702. Further, the program 708 may be recorded in a recording medium 709 such as a memory card and read by the drive device 705, or may be transmitted from an external device via a network 710. The communication interface 706 exchanges data with the external device via the network 710. The input-output interface 707 exchanges data with a peripheral apparatus (such as an input device and a display device). The communication interface 706 and the input-output interface 707 may function as a component for acquiring or outputting data.

Note that a component of the device according to the present disclosure may be constituted of a single circuit (such as a processor) or a combination of a plurality of circuits. The circuit (circuitry) herein may be either a dedicated or general-purpose circuit.

The configuration described as a single device in the above-described example embodiments may be distributed and provided in a plurality of devices. For example, the image processing devices 100 and 220 may be achieved by a plurality of computer devices by using a cloud computing technology and the like.

As described above, the present invention has been described by taking the example embodiments and the modification examples described above as model examples. However, the present invention is not limited to these example embodiments and modification examples. The present invention may include an example embodiment to which various modifications or applications that may be understood by a so-called person skilled in the art are applied within the scope of the present invention.

REFERENCE SIGNS LIST

100 Image processing device
110 Acquisition unit
120 Estimation unit
130 Generation unit
140 Correction unit
200 Image processing system
210 Image capturing device
220, 220a, 220b Image processing device
221 Data acquisition unit
222 Spectrum estimation unit
223 Visible image generation unit
224 Near-infrared image generation unit
225, 226 Signal isolation unit
227 Optimization unit
300, 600 Image capturing device
700 Computer device

The invention claimed is:

1. An image processing device, comprising:
at least one memory configured to store a computer program; and
at least one processor configured to execute the computer program to perform:
acquiring a color image that is captured by an image capturing means according to incident light including visible light and near-infrared light, and includes a first region and a second region captured with near-infrared light being further reduced from incident light than that in the first region;
estimating a spectral characteristic of incident light, based on color information about the acquired color image, a spectral sensitivity characteristic of the image capturing means, and information acquired by modeling the spectral characteristic of the incident light, using a weighted sum of an average vector and several basis vectors, the average vector and the several basis vectors acquired by performing a principal component analysis;

generating a visible image and a near-infrared image, based on the estimated spectral characteristic and a spectral sensitivity characteristic of the image capturing means; and correcting the generated visible image and the generated near-infrared image, based on color information in the second region of the color image.

2. The image processing device according to claim 1, wherein the color image includes M channels (M is an integer equal to or greater than two), and wherein the information is acquired by modeling the spectral characteristic of the incident light by an average vector of incident light and basis vectors of equal to or less than M+1.

3. The image processing device according to claim 1, wherein the at least one processor is configured to perform:

generating the visible image, based on the estimated spectral characteristic of the incident light and a spectral sensitivity characteristic of the image capturing means, and generating the near-infrared image, based on the color image and the generated visible image.

4. The image processing device according to claim 3, wherein the at least one processor is configured to perform:

generating the near-infrared image, based on a difference between the color image and the generated visible image.

5. The image processing device according to claim 1, wherein the at least one processor is configured to perform:

generating the near-infrared image, based on the estimated spectral characteristic of the incident light and a spectral sensitivity characteristic of the image capturing means, and generating the visible image, based on the color image and the generated near-infrared image.

6. The image processing device according to claim 5, wherein the at least one processor is configured to perform:

generating the visible image, based on a difference between the color image and the generated near-infrared image.

7. The image processing device according to claim 2, wherein the M is three, and wherein the color image is constituted of color components of three colors of red, green, and blue.

8. An image processing method, comprising:

acquiring a color image that is captured by image capturing means according to incident light including visible light and near-infrared light, and includes a first region and a second region captured with near-infrared light being further reduced from incident light than that in the first region;

estimating a spectral characteristic of incident light, based on color information about the acquired color image, a spectral sensitivity characteristic of the image capturing means, and information acquired by modeling the spectral characteristic of the incident light using a weighted sum of an average vector and several basis vectors, the average vector and the several basis vectors acquired by performing a principal component analysis;

generating a visible image and a near-infrared image, based on the estimated spectral characteristic and a spectral sensitivity characteristic of the image capturing means; and correcting the generated visible image and the generated near-infrared image, based on color information in the second region of the color image.

9. A non-transitory computer-readable program recording medium that records a program for causing a computer to execute:

a step of acquiring a color image that is captured by image capturing means according to incident light including visible light and near-infrared light, and includes a first region and a second region captured with near-infrared light being further reduced from incident light than that in the first region;

a step of estimating a spectral characteristic of incident light, based on color information about the acquired color image, a spectral sensitivity characteristic of the image capturing means, and information acquired by modeling the spectral characteristic of the incident light, using a weighted sum of an average vector and several basis vectors, the average vector and the several basis vectors acquired by performing a principal component analysis;

a step of generating a visible image and a near-infrared image, based on the estimated spectral characteristic and a spectral sensitivity characteristic of the image capturing means; and a step of correcting the generated visible image and the generated near-infrared image, based on color information in the second region of the color image.

* * * * *